US007716160B2

(12) United States Patent  (10) Patent No.: US 7,716,160 B2
Smith et al.  (45) Date of Patent: May 11, 2010

(54) METHODS AND APPARATUSES TO IDENTIFY DEVICES

(75) Inventors: John Stephen Smith, Berkeley, CA (US); Curtis L. Carrender, Morgan Hill, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 788 days.

(21) Appl. No.: 10/982,557

(22) Filed: Nov. 5, 2004

(65) Prior Publication Data

US 2005/0114326 A1  May 26, 2005

Related U.S. Application Data

(60) Provisional application No. 60/518,229, filed on Nov. 7, 2003.

(51) Int. Cl.
G06F 17/30 (2006.01)
(52) U.S. Cl. .................. 707/4; 707/2; 707/5; 707/6; 707/104.1; 340/10.2; 709/237
(58) Field of Classification Search ........... 340/10.2; 709/237
See application file for complete search history.

(56) References Cited

U.S. PATENT DOCUMENTS

| | | |
|---|---|---|
| 3,866,029 A | 2/1975 | Chevalier |
| 4,071,908 A | 1/1978 | Brophy et al. |
| 4,107,675 A | 8/1978 | Sellers et al. |
| RE31,375 E | 9/1983 | Sellers et al. |
| 4,495,496 A | 1/1985 | Miller, III |
| 4,510,495 A | 4/1985 | Sigrimis et al. |
| 4,667,193 A | 5/1987 | Cotie et al. |

(Continued)

FOREIGN PATENT DOCUMENTS

CA  2266337 A1  9/2000

(Continued)

OTHER PUBLICATIONS

Floerkemeier, Christian, et al., PML Core Specification 1.0, Auto-ID Center Recommendation, Sep. 15, 2003, Copyright 2003 Auto-ID Center, 48 pages.

(Continued)

*Primary Examiner*—Pierre M Vital
*Assistant Examiner*—Mohammad S Rostami
(74) *Attorney, Agent, or Firm*—Blakely, Sokoloff, Taylor & Zafman LLP

(57) ABSTRACT

Embodiments of the present invention include systems with Readers and Tags in which a Reader queries the Tags with a parameter that includes a level of probability of reply according to which the Tags individually and randomly decide whether or not to reply. In one embodiment, the Tags can switch between two states: A and B. The query command also specifies a state (A or B) so that only the Tags in the specified state can reply. After successfully sending the Tag identification data from a Tag to the Reader, the Tag switches to the other state from the specified state. In one embodiment, the operations about the two states are symmetric. In one embodiment, the Tags can remember the parameters used in a query so that a short form of query command can be used to repeat the query with the same query parameters.

66 Claims, 17 Drawing Sheets

U.S. PATENT DOCUMENTS

| | | |
|---|---|---|
| 4,785,291 A | 11/1988 | Hawthorne |
| 4,822,990 A | 4/1989 | Tamada et al. |
| 5,053,774 A | 10/1991 | Schuermann et al. |
| 5,063,386 A | 11/1991 | Bourdeau et al. |
| 5,144,314 A | 9/1992 | Malmberg et al. |
| 5,245,534 A | 9/1993 | Waterhouse et al. |
| 5,266,925 A | 11/1993 | Vercellotti et al. |
| 5,305,008 A | 4/1994 | Turner et al. |
| 5,339,073 A | 8/1994 | Dodd et al. |
| 5,365,551 A | 11/1994 | Snodgrass et al. |
| 5,387,915 A | 2/1995 | Moussa et al. |
| 5,387,993 A | 2/1995 | Heller et al. |
| 5,398,326 A | 3/1995 | Lee |
| 5,410,315 A | 4/1995 | Huber |
| 5,434,572 A | 7/1995 | Smith |
| 5,438,335 A | 8/1995 | Schuermann et al. |
| 5,444,448 A | 8/1995 | Schuermann et al. |
| 5,491,482 A | 2/1996 | Dingwall et al. |
| 5,500,650 A | 3/1996 | Snodgrass et al. |
| 5,502,445 A | 3/1996 | Dingwall et al. |
| 5,519,381 A | 5/1996 | Marsh et al. |
| 5,537,105 A | 7/1996 | Marsh et al. |
| 5,548,291 A | 8/1996 | Meier et al. |
| 5,550,547 A | 8/1996 | Chan et al. |
| 5,557,280 A | 9/1996 | Marsh et al. |
| 5,583,850 A | 12/1996 | Snodgrass et al. |
| 5,604,486 A | 2/1997 | Lauro et al. |
| 5,627,544 A | 5/1997 | Snodgrass et al. |
| 5,640,002 A | 6/1997 | Ruppert et al. |
| 5,641,365 A | 6/1997 | Peterson et al. |
| 5,673,037 A | 9/1997 | Cesar et al. |
| 5,680,459 A | 10/1997 | Hook et al. |
| 5,698,837 A | 12/1997 | Furuta |
| 5,699,066 A | 12/1997 | Marsh et al. |
| 5,726,630 A | 3/1998 | Marsh et al. |
| 5,742,238 A | 4/1998 | Fox |
| 5,774,062 A | 6/1998 | Ikefuji |
| 5,774,876 A | 6/1998 | Woolley et al. |
| 5,777,561 A | 7/1998 | Chieu et al. |
| 5,804,810 A | 9/1998 | Woolley et al. |
| 5,828,318 A | 10/1998 | Cesar |
| 5,832,520 A | 11/1998 | Miller |
| 5,841,365 A | 11/1998 | Rimkus |
| 5,850,187 A | 12/1998 | Carrender et al. |
| 5,856,788 A | 1/1999 | Walter et al. |
| 5,874,724 A | 2/1999 | Cato |
| 5,883,582 A | 3/1999 | Bowers et al. |
| 5,892,441 A | 4/1999 | Woolley et al. |
| 5,909,559 A | 6/1999 | So |
| 5,929,779 A | 7/1999 | MacLellan et al. |
| 5,940,006 A | 8/1999 | MacLellan et al. |
| 5,963,134 A | 10/1999 | Bowers et al. |
| 5,966,083 A | 10/1999 | Marsh et al. |
| 5,974,078 A | 10/1999 | Tuttle et al. |
| 5,995,017 A | 11/1999 | Marsh et al. |
| 5,995,019 A | 11/1999 | Chieu et al. |
| 6,021,433 A | 2/2000 | Payne et al. |
| 6,027,027 A | 2/2000 | Smithgall |
| 6,034,603 A | 3/2000 | Steeves |
| 6,036,101 A | 3/2000 | Hass et al. |
| 6,072,801 A | 6/2000 | Wood, Jr. et al. |
| 6,078,258 A | 6/2000 | Auerbach et al. |
| 6,084,512 A | 7/2000 | Elberty et al. |
| 6,089,453 A | 7/2000 | Kayser et al. |
| 6,102,286 A | 8/2000 | Hammond |
| 6,130,630 A | 10/2000 | Grohs et al. |
| 6,177,858 B1 | 1/2001 | Raimbault et al. |
| 6,198,381 B1 | 3/2001 | Turner et al. |
| 6,204,765 B1 | 3/2001 | Brady et al. |
| 6,236,315 B1 | 5/2001 | Helms et al. |
| 6,259,367 B1 | 7/2001 | Klein |
| 6,263,332 B1 * | 7/2001 | Nasr et al. .................. 707/5 |
| 6,282,186 B1 * | 8/2001 | Wood, Jr. .................. 370/346 |
| 6,307,847 B1 * | 10/2001 | Wood, Jr. .................. 370/329 |
| 6,307,848 B1 * | 10/2001 | Wood, Jr. .................. 370/329 |
| 6,321,982 B1 * | 11/2001 | Gaultier .................. 235/380 |
| 6,377,203 B1 | 4/2002 | Doany |
| 6,379,058 B1 | 4/2002 | Petteruti et al. |
| 6,438,540 B2 * | 8/2002 | Nasr et al. .................. 707/3 |
| 6,442,496 B1 | 8/2002 | Pasadyn et al. |
| 6,443,891 B1 | 9/2002 | Grevious |
| 6,456,191 B1 | 9/2002 | Federman |
| 6,480,143 B1 | 11/2002 | Kruger et al. |
| 6,483,427 B1 | 11/2002 | Werb |
| 6,496,833 B1 | 12/2002 | Goldberg et al. |
| 6,512,463 B1 | 1/2003 | Campbell et al. |
| 6,538,563 B1 | 3/2003 | Heng |
| 6,538,564 B1 | 3/2003 | Cole |
| 6,550,674 B1 | 4/2003 | Neumark |
| 6,570,487 B1 | 5/2003 | Steeves |
| 6,641,036 B1 | 11/2003 | Kalinowski |
| 6,646,543 B1 | 11/2003 | Mardinian et al. |
| 6,661,336 B1 | 12/2003 | Atkins |
| 6,677,852 B1 | 1/2004 | Landt |
| 6,690,263 B1 | 2/2004 | Grieu |
| 6,725,260 B1 | 4/2004 | Philyaw |
| 6,784,787 B1 | 8/2004 | Atkins et al. |
| 6,837,427 B2 | 1/2005 | Overhultz et al. |
| 6,868,073 B1 | 3/2005 | Carrender et al. |
| 6,876,294 B1 | 4/2005 | Regan |
| 6,882,995 B2 * | 4/2005 | Nasr et al. .................. 707/3 |
| 6,889,234 B1 | 5/2005 | Li et al. |
| 6,933,677 B1 | 8/2005 | Karpen |
| 6,988,667 B2 * | 1/2006 | Stewart et al. .............. 235/492 |
| 7,009,495 B2 * | 3/2006 | Hughes et al. ............. 340/10.2 |
| 7,009,496 B2 * | 3/2006 | Arneson et al. ............ 340/10.2 |
| 7,018,575 B2 | 3/2006 | Brewer et al. |
| 7,028,024 B1 * | 4/2006 | Kommers et al. .............. 707/3 |
| 7,043,633 B1 * | 5/2006 | Fink et al. .................. 713/162 |
| 7,053,755 B2 | 5/2006 | Atkins et al. |
| 7,119,664 B2 * | 10/2006 | Roesner .................. 340/10.33 |
| 7,193,504 B2 * | 3/2007 | Carrender et al. .......... 340/10.4 |
| 7,195,173 B2 * | 3/2007 | Powell et al. ............... 235/492 |
| 7,253,717 B2 | 8/2007 | Armstrong et al. |
| 7,272,466 B2 | 9/2007 | Graushar et al. |
| 7,284,703 B2 | 10/2007 | Powell et al. |
| 7,315,522 B2 | 1/2008 | Wood, Jr. |
| 7,356,749 B2 | 4/2008 | Dominique et al. |
| 2001/0023482 A1 * | 9/2001 | Wray .................. 713/151 |
| 2001/0024448 A1 | 9/2001 | Takase et al. |
| 2001/0038037 A1 | 11/2001 | Bridgelall et al. |
| 2002/0123325 A1 * | 9/2002 | Cooper .................. 455/411 |
| 2002/0149481 A1 | 10/2002 | Shanks et al. |
| 2003/0099211 A1 | 5/2003 | Moulsley et al. |
| 2004/0179588 A1 * | 9/2004 | Kuffner et al. ............. 375/224 |
| 2006/0279408 A1 | 12/2006 | Atkins |
| 2008/0018431 A1 | 1/2008 | Turner et al. |

FOREIGN PATENT DOCUMENTS

| | | |
|---|---|---|
| CN | 1255993 A | 6/2000 |
| EP | 0 553 905 A1 | 8/1993 |
| EP | 0 702 324 A2 | 3/1996 |
| GB | 2 340 692 | 2/2000 |
| WO | WO 98/32092 A1 | 7/1998 |
| WO | WO 98/39725 A1 | 9/1998 |
| WO | WO 01/01326 A2 | 1/2001 |
| WO | WO 01/41043 A1 | 6/2001 |
| WO | WO 02/054365 A1 | 7/2002 |
| WO | WO 02/097708 A2 | 12/2002 |

| | | | |
|---|---|---|---|
| WO | WO 03/032240 A2 | 4/2003 | |
| WO | WO 2005/015480 A2 | 2/2005 | |

OTHER PUBLICATIONS

Draft protocol specification for a 900 MHz Class 0 Radio Frequency Identification Tag, Auto-ID Center, Feb. 23, 2003, 49 pages.

EPC™ Tag Data Standards Version 1.1 Rev. 1.24, Standard Specification, Apr. 1, 2004, Copyright 2004 EPCglobal®, 78 pages.

Technical Report, 860MHz-930-MHz Class 1 Radio Frequency Identification Tag Radio Frequency & Logical Communication Interface Specification Candidate Recommendation, Version 1.0.1, Auto-ID Center, published Nov. 14, 2002, Auto-ID Center Massachusetts Institute of Technology, 77 Massachusetts Avenue, Bldg. 3-449, Cambridge, MA 02139-4307, USA, 19 pages.

"PCT Transmittal of the International Search Report and the Written Opinion of the International Searching Authority" for PCT International Application. No. US2004/036991, mailed Feb. 28, 2005 (13 pages).

PCT Written Opinion for PCT Appln No. PCT/US02/33402, mailed Jan. 26, 2005 (4 pages).

PCT Notification of Transmittal of the International Search Report or the Declaration for Appln No. PCT/US02/33402, mailed Jan. 15, 2003 (5 pages).

PCT Notification of Transmittal of the International Search Report or the Written Opinion of the International Searching Authority, or Declaration for Appln No. PCT/US2004/025883, mailed Nov. 11, 2004 (12 pages).

PCT Notification of Transmittal of the International Search Report or the Declaration for Appln No. PCT/US02/17159, mailed Jan. 15, 2003 (9 pages).

PCT Written Opinion of the International Preliminary Examining Authority and Written Opinion for Appln No. PCT/US02/17159, mailed May 6, 2005 (5 pages).

PCT International Preliminary Report on Patentability and Written Opinion for Appln No. PCT/US2004/036991, mailed May 18, 2006 (8 pages).

PCT Invitation to Pay Additional Fees for PCT International Application No. US02/17159, mailed Oct. 16, 2002 (Total 9 pages).

PCT Preliminary Examination Report for PCT Appln No. US02/17159, mailed Nov. 4, 2005 (5 pages).

Tagsys, SA, International Organization for Standardization (ISO) and International Electrotechnical Commission (IEC) Patent Statement and Licensing Declaration, 3 pages SGS__200602__497__18000-GAM1__IP3.pdf. (3 pages).

\* cited by examiner

METHODS AND APPARATUSES TO IDENTIFY DEVICES

This application is related to, claims the benefit of and incorporates by reference, Provisional U.S. Patent Application Ser. No. 60/518,229, filed Nov. 7, 2003. This application also claims the benefit of, and incorporates by reference, three prior U.S. Patent Applications: (1) U.S. patent application Ser. No. 10/160,458, filed May 30, 2002; (2) U.S. patent application Ser. No. 10/267,924, filed Oct. 8, 2002; and (3) U.S. patent application Ser. No. 10/915,725, filed Aug. 9, 2004.

TECHNICAL FIELD

The invention relates to the field of devices having an identifier, such as Tags, and further relates to methods and apparatuses for identifying such Tags.

BACKGROUND

Multiple wireless Tags can be interrogated by sending a code from an interrogating transmitter (e.g., a Reader) and having information transmitted by the Tag in response. This is commonly accomplished by having the Tag listen for an interrogation message and for it to respond with a unique serial number and/or other information. The Tags typically have limited power available for transmitting data wirelessly to the Reader. It is desirable to extend the range of wireless Tags so that it is not necessary to bring each Tag close to a Reader for reading. However, when the range of the reading system is extended, many Tags will be within the range of the interrogating system so that their replies may corrupt each other.

Current implementations of radio frequency (RF) Tags require considerable logic to handle interface protocols and anti-collision problems that occur when multiple Tags within the range of a Reader all attempt to reply to an interrogating message. For example, current integrated circuits that are used in RF Tags require nearly 3,000 logic gates to handle an interface protocol and to handle anti-collision protocols. This considerable size required by an integrated circuit increases the cost of the RF Tag and thus makes it less likely for such a Tag to be more commonly used. Prior art attempts to avoid collisions when reading multiple RF Tags are described in U.S. Pat. Nos. 5,266,925, 5,883,582 and 6,072,801. However, these prior art approaches provide inefficient solutions for avoiding collisions when reading multiple RF Tags.

SUMMARY OF EMBODIMENTS OF THE INVENTION

Methods and apparatuses to identify Tags are described here. Some of the embodiments of the present invention are summarized in this section.

Embodiments of the present invention include systems with Readers and Tags in which a Reader queries the Tags with a parameter that specifies a level of probability of reply according to which the Tags individually and randomly decide whether or not to reply. In one example, the Tags can switch between two states: A and B. The query command also specifies a state (A or B) so that only the Tags in the specified state can reply. After successfully sending the Tag identification data from a Tag to the Reader, the Tag switches to the other state from the specified state. In one embodiment, the operations about the two states are symmetric. In another embodiment, the Tags can remember the parameters used in a query so that a short form of query command can be used to repeat the query with the same query parameters.

In one aspect of the present invention, a method for querying a plurality of Tags includes broadcasting a first query command with a first value of a probability parameter, where the first value of the probability parameter indicates a first probability of reply according to which each of the plurality of Tags randomly determines whether or not to reply, and detecting a reply in response to the first query command. In one embodiment, in response to a determination that there is no reply to one or more query commands to query according to the first value of the probability parameter, a Reader further broadcasts a second query command with a second value of the probability parameter where the second value of the probability parameter indicates a second probability of reply which is greater than the first probability of reply. In another embodiment, in response to a determination that there is no legible reply to one or more query commands to query according to the first value of the probability parameter, due to collision of multiple replies, a Reader further broadcasts a second query command with a second value of the probability parameter where the second value of the probability parameter indicates a second probability of reply which is less than the first probability of reply. In one embodiment, the first value is an integer Q, the first probability of reply for one of the plurality of Tags is substantially equal to $p^Q$ and p is less than 1 (e.g., p can be substantially equal to 0.5). In one embodiment, the first probability of reply for a first one of the plurality of Tags is different from the first probability of reply for a second one of the plurality of Tags. In one embodiment, the first query command further includes a state flag indicating a first state so that Tags in a second state do not reply to the first query command and Tags in the first state reply to the first query command randomly according to the first value of the probability parameter. In one embodiment, a Reader 1) broadcasts a second query command with a second value of the probability parameter and a state flag indicating the second state so that Tags in the first state do not reply to the second query command and Tags in the second state reply to the second query command randomly according to the second value of the probability parameter, and 2) detects a reply in response to the second query command. In one embodiment, the first and second query commands are symmetric with respect to the first and second states. In one embodiment, in response to a legible reply to the first query command, which reply includes first handshaking data, a Reader further sends a second command including the first handshaking data and receives Tag identification data as a reply to the second command. When the identification Tag data is not received successfully, the Reader further sends a command to indicate an error in receiving the Tag data. In one embodiment, a Reader further broadcasts a second query command without specifying a value of the probability parameter to query according to the first value of the probability parameter. The first query command includes second values of a plurality of parameters including the probability parameter, and the second query command does not specify values of the plurality of parameters to query according to the second values of the plurality of parameters. In one example, the second query command is substantially shorter than the first query command.

In another aspect of the preset invention, a method for a Tag to respond to a query from a Reader includes receiving from the Reader a first query command with a first value of a probability parameter, and randomly deciding whether or not to reply to the first query command so that a probability of reply is according to the first value of the probability parameter. In one example, in response to a random decision to reply, a Tag further sends a reply with first handshaking data, which can be a random number generated in response to the first query command. In one embodiment, the first value is an integer Q, the first probability of reply for one of the plurality of Tags is substantially equal to $p^Q$, and p is less than 1 (e.g., p can be substantially equal to 0.5). In one embodiment, the first query command further includes a state flag indicating a first state, the Tag does not reply to the first query command if the Tag is in a second state; and the Tag replies to the first query command randomly according to the first value of the probability parameter if the Tag is in the first state. In one embodiment, a Tag 1) receives a second query command with a second value of the probability parameter and a state flag indicating the second state, and 2) randomly decides whether or not to reply to the second query command so that a probability of reply is according to the second value of the probability parameter, if the Tag is in the second state. The Tag does not reply to the second query command if the Tag is in the first state. In one embodiment, the Tag processes the first and second query command with symmetry with respect to the first and second states. In one embodiment, a Tag further sends a first reply with first handshaking data in response to a random decision to reply, and in response to receiving from the Reader a second command including the first handshake data, the Tag sends a second reply with Tag identification data. In one embodiment, in response to receiving a query command after sending the second reply, the Tag switches from the first state to the second state and, after receiving a command indicating an error in receiving the Tag identification data at the Reader, the Tag remains in the first state if a query command is received after the command indicating the error. In one embodiment, a Tag further receives a second query command that does not specify a value of the probability parameter and the Tag randomly decides whether or not to reply to the second query command so that a probability of reply is according to the first value of the probability parameter. In one embodiment, the first query command includes values of a plurality of parameters including the probability parameter; the second query command does not specify values of the plurality of parameters, and the Tag processes the second query command according to the second values of the plurality of parameters. In one embodiment, the second query command is substantially shorter than the first query command.

The present invention includes methods and apparatuses that perform these methods, including data processing systems that perform these methods, and computer readable media which when executed on data processing systems cause the systems to perform these methods.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to avoid obscuring the description of the present invention. The term "coupled" as used herein, may mean directly coupled or indirectly coupled through one or more intervening components. References to one or an embodiment in the present disclosure are not necessarily references to the same embodiment, and such references mean at least one.

Figure 1:
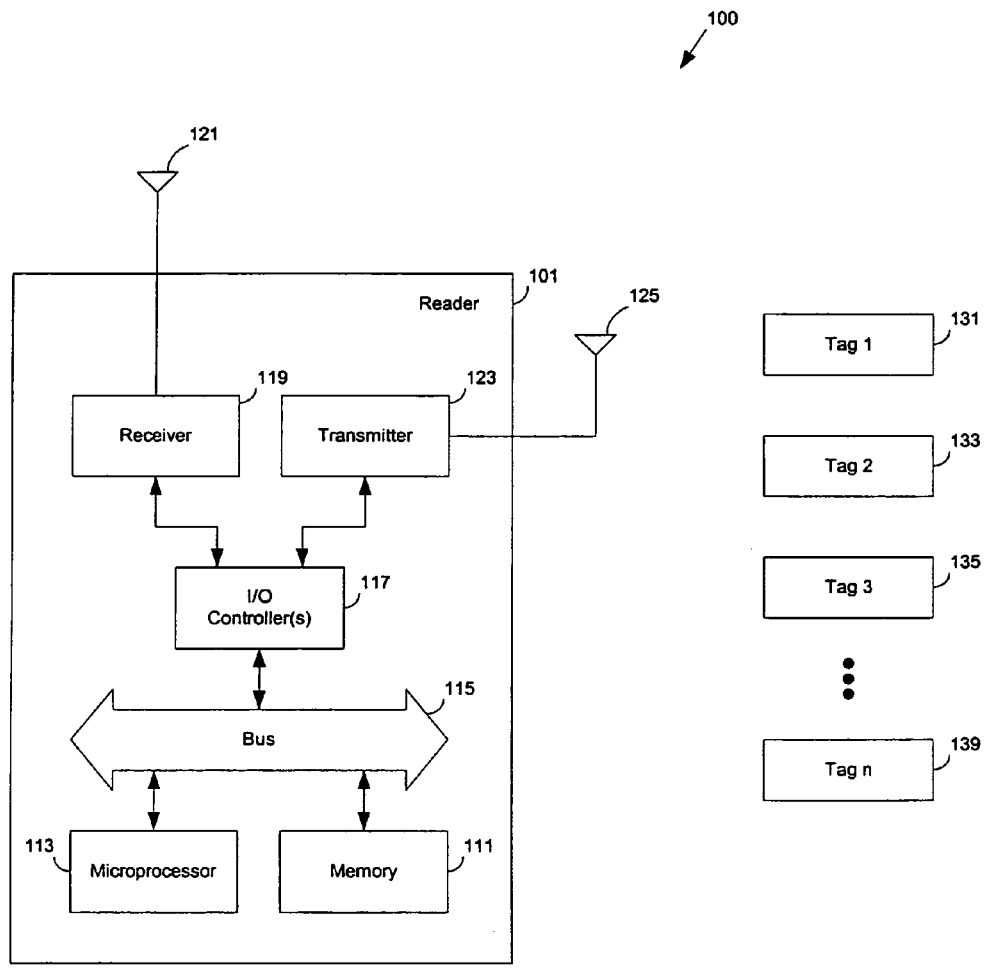
FIG. 1 shows an example of an identification system, which includes a Reader, and a plurality of RF Tags.

FIG. 1 illustrates an example of an identification system 100 which includes a Reader 101 and a plurality of Tags 131, 133, 135, . . . and 139. The system is typically a Reader-talks-first RF ID system using either passive or semi-passive active backscatter transponders as Tags. The incorporation of a battery and/or memory into a Tag is an expanded feature to facilitate longer read range; however, the use of the battery does require certain trade-offs, such as higher costs, limited longevity, larger form factor, greater weight and end-of-life disposal requirements. Thus, the Tags 131-139 may have memory and/or a battery or may have neither of these elements. It will be appreciated that different types of Tags may be mixed in a system where a Reader is interrogating Tags with batteries and Tags without batteries. There are at least 4 classes of Tags which may be used with the present invention: (1) no power source on the Tag except for power which is obtained from the Tag's antenna, but the Tag does include a read-only memory which has the Tag's identification code, (2) a Tag without internal power, but when powered from the Reader, can write data to non-volatile memory in the Tag; this type of Tag also includes memory for storing the identification code, (3) a Tag with a small battery to provide power to the circuitry in the Tag. Such a Tag may also include non-volatile memory as well as memory for storing the Tag's identification code, and (4) a Tag which can communicate with other Tags or other devices.

FIG. 1 shows an embodiment of a Reader. The Reader 101 typically includes a receiver 119 and a transmitter 123, each of which is coupled to an I/O (input/output) controller 117. The receiver 119 may have its own antenna 121, and the transmitter 123 may have its own antenna 125. It will be appreciated by those in the art that the transmitter 123 and the receiver 119 may share the same antenna provided that there is a receive/transmit switch which controls the signal present on the antenna and which isolates the receiver and transmitter from each other. The receiver 119 and the transmitter 123 may be similar to conventional receiver and transmitter units found in current Readers. The receiver and transmitter typically operate, in North America, in a frequency range of about 900 megahertz. Each is coupled to the I/O controller 117 that controls the receipt of data from the receiver and the transmission of data, such as commands, from the transmitter 123. The I/O controller is coupled to a bus 115 that is in turn coupled to a microprocessor 113 and a memory 111. There are various different possible implementations that may be used in the Reader 101 for the processing system represented by elements 117, 115, 113 and 111. In one implementation, the microprocessor 113 is a programmable microcontroller, such as an 8051 microcontroller or other well-known microcontrollers or microprocessors (e.g. a PowerPC microprocessor) and the memory 111 includes dynamic random access memory and a memory controller that controls the operation of the memory. M memory 111 may also include a non-volatile read only memory for storing data and software programs. The memory 111 typically contains a program that controls the operation of the microprocessor 113 and also contains data used during the processing of Tags as in the interrogation of Tags. In one embodiment further described below, the memory 111 would typically include a computer program which causes the microprocessor 113 to send search commands through the I/O controller to the transmitter and to receive responses from the Tags through the receiver 119 and through the I/O controller 117. The Reader 101 may also include a network interface, such as an Ethernet interface, which allows the Reader to communicate to other processing systems through a network. The network interface would typically be coupled to the bus 115 so that it can receive data, such as the list of Tags identified in an interrogation from either the microprocessor 113 or from the memory 111.

Figure 2:
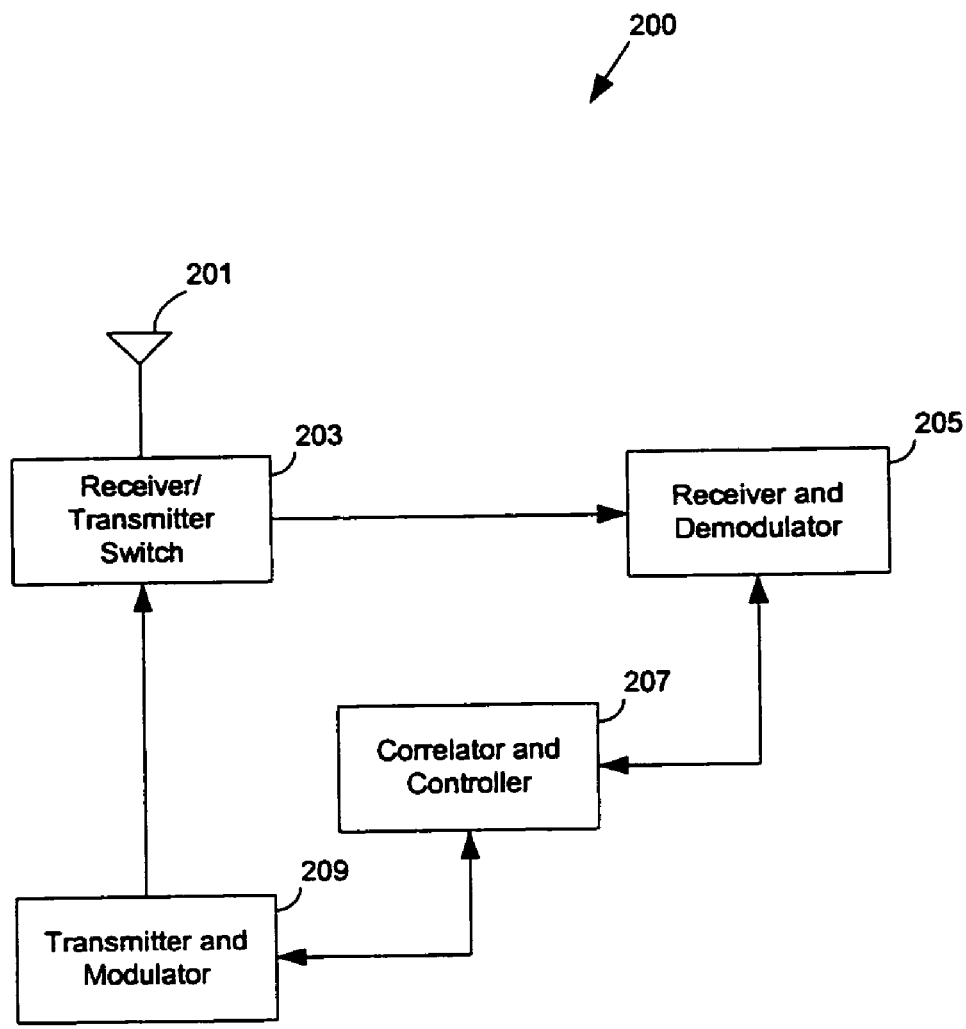
FIG. 2 shows an example of one embodiment of an RF Tag that may be used with embodiments of the present invention.

FIG. 2 shows an example of one implementation of a Tag that may be used with the present invention. The Tag 200 includes an antenna 201 that is coupled to a receive/transmit switch 203. This switch is coupled to the receiver and demodulator 205 and to the transmitter and modulator 209. A correlator and controller unit 207 is coupled to the receiver and demodulator 205 and to the transmitter 209. The particular example shown in FIG. 2 of a Tag may be used in various embodiments in which a memory for maintaining data between commands is maintained in the Tag and in which a bit by bit correlation occurs in the Tag. The receiver and demodulator 205 receives signals through the antenna 201 and the switch 203, demodulates the signals, and provides these signals to the correlator and controller unit 207. Commands received by the receiver 205 are passed to the controller of the unit 207 in order to control the operation of the Tag. Data received by the receiver 205 is also passed to the control unit 207, and this data may include parameters for a query command and handshake data from a handshake command in the embodiments described below. The transmitter 209, under control of the control unit 207, transmits responses or other data through the switch 203 and the antenna 201 to the Reader. It will be appreciated by those in the art that the transmitter may be merely a switch or other device that modulates reflections from an antenna, such as antenna 201.

In one embodiment of the present invention, to achieve Tag cost low enough to enable ubiquitous use of Tags in the supply chain, the Tags are designed with properties, such as a small Integrated Circuit (IC) area to permit low cost, small memory, non-precision timing requirements, atomic transactions to minimize Tag state storage requirements and others. Such Tags can be produced at low cost. However, other Tag designs can also be used. Further, it is understood that the method of avoid collisions in communications according to embodiments of the present invention can also be used in other similar situations.

Figure 3:
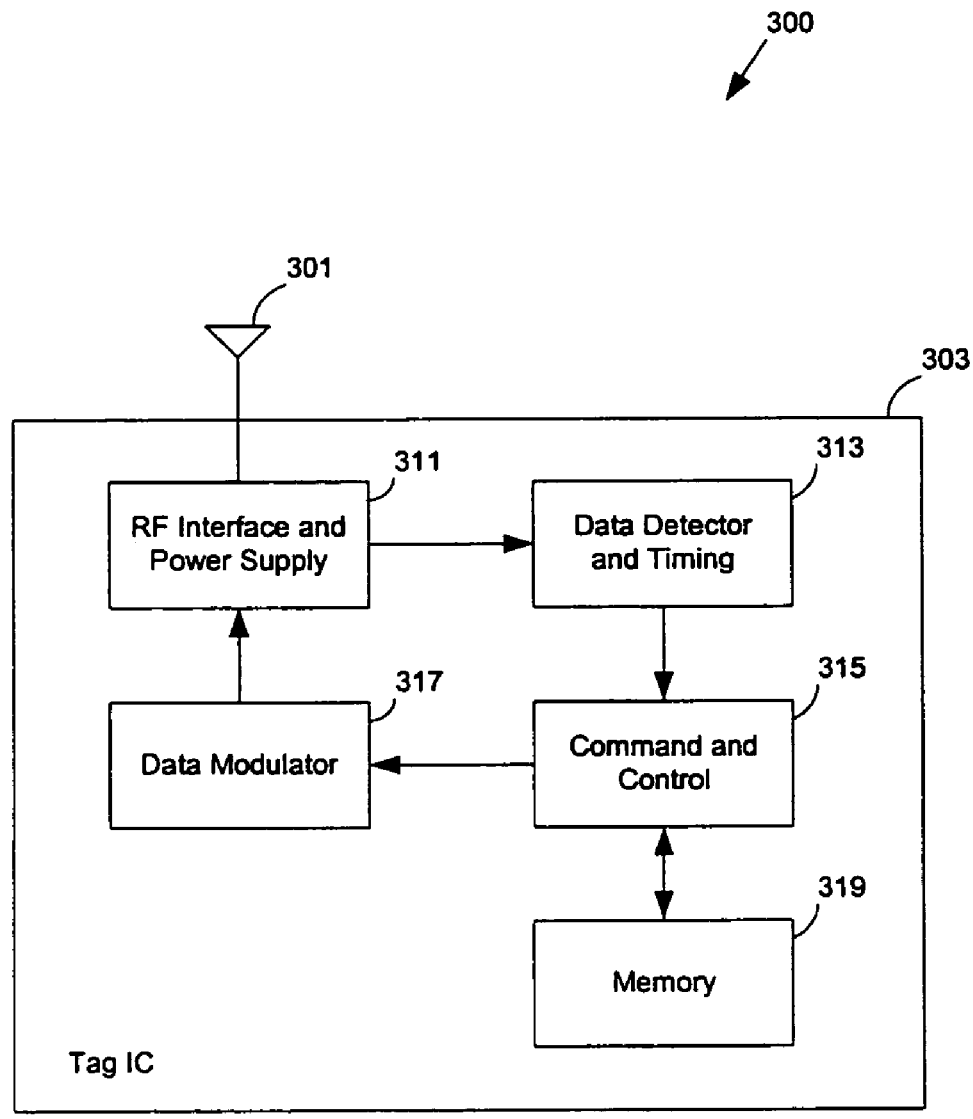
FIG. 3 shows an example of an RF Tag according to one embodiment of the present invention.

FIG. 3 shows an example of an RF Tag according to one embodiment of the present invention. In one embodiment, a VLC (Very Low Cost) Tag 300 includes an antenna 301 and an integrated circuit 303, connected together. The Tag IC 303 implements the command protocol and contains the ePC (Electronic Product Code). The antenna 301 receives the Reader interrogation signals and reflects the interrogation signal back to the Reader in response to a modulation signal created by the IC 303. The Tag IC 303 implements the VLC Tag by combining an RF interface and power supply 311, data detector and timing circuit 313, command and control 315, data modulator 317 and memory 319. In one embodiment, command and control 315 includes static logic which implements the communication protocol according to embodiments of the present invention.

The RF Interface and Power Supply 311 converts the RF energy into the DC power required for the Tag IC 303 to operate, and provides modulation information to the Data Detector and Timing circuit 313. The RF interface also provides a means of coupling the Tag modulation signals to the antenna for transmission to the Reader. The Data Detector and Timing circuit 313 de-modulates the Reader signals and generates timing and data signals used by the command and control 315. The command and control 315 coordinates all of the functions of the Tag IC 303. The command and control 315 may include state logic to interpret data from the Reader, perform the required internal operations and determines if the Tag will respond to the Reader. The command and control 315 implements the state diagram and communications protocol according to embodiments of the present invention. The memory 319 contains the ePC code of the item Tagged by a VLC Tag. The data modulator 317 translates the binary Tag data into a signal that is then applied to the RF Interface 311 and then transmitted to the Reader (e.g., Reader 101).

The design and implementation of the Tags can be characterized in layers. For example, a physical and environmental layer characterizes the mechanical, environmental, reliability and manufacturing aspects of a Tag a radio frequency (RF) transport layer characterizes RF coupling between Reader and Tag and a communication layer characterizes communications/data protocols between Readers and Tags. Various different implementations of Tags at different layers can be used with embodiments of the present invention. It is understood that the implementations of the Tags are not limited to the examples shown in this description. Different Tags or communication devices can use methods of the embodiments of the present invention for communication according to the needs of the target application.

In one embodiment of the invention, a Tag may be fabricated through a fluidic self-assembly process. For example, an integrated circuit may be fabricated with a plurality of other integrated circuits in a semiconductor wafer. The integrated circuit will include, if possible, all the necessary logic of a particular RF Tag, excluding the antenna 301. Thus, all the logic shown in the Tag 300 would be included on a single integrated circuit and fabricated with similar integrated circuits on a single semiconductor wafer. Each circuit would be programmed with a unique identification code and then the wafer would be processed to remove each integrated circuit from the wafer to create blocks that are suspended in a fluid.

The fluid is then dispersed over a substrate, such as a flexible substrate, to create separate RF Tags. Receptor regions in the substrate would receive at least one integrated circuit, which then can be connected with an antenna on the substrate to form an RF Tag. An example of fluidic self-assembly is described in U.S. Pat. No. 5,545,291.

Figure 4:
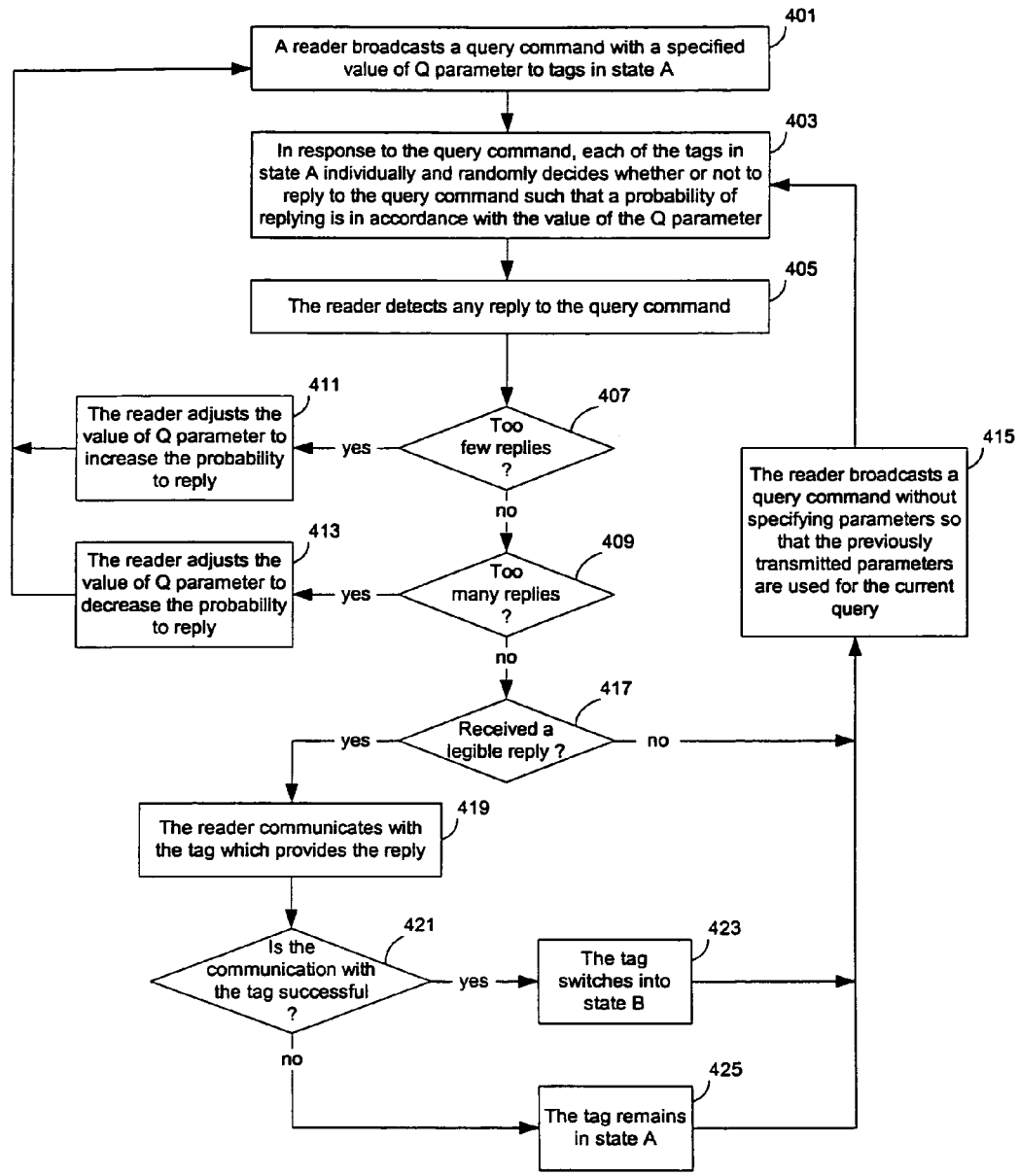
FIG. 4 illustrates a flowchart representation of a communication method according to one embodiment of the present invention.

FIG. 4 illustrates a flowchart representation of a communication method according to one embodiment of the present invention. A Reader broadcasts a query command with a specified value of Q parameter to Tags in state A (401). In response to the query command, each of the Tags in state A individually and randomly decides whether or not to reply to the query command such that a probability of replying is in accordance with the value of the Q parameter (403). Tags in state B do not reply to the query command which is for tags in state A. The Reader then detects any reply to the query command (405). It is determined whether there are too few replies (407). For example, when the Reader obtains no reply for a number of query commands with the specified value of Q parameter, the Reader may determine that the specified level of probability to reply is too low and there are too few replies. When there are too few replies, the Reader adjusts the value of Q parameter to increase the probability to reply (411). Similarly, it is determined whether there are too many replies (409). When there are too many replies, the replies from different Tags corrupt each other. Thus, the Reader adjusts the value of Q parameter to decrease the probability to reply when there are too many replies. If no legible reply is received (417), the Reader broadcasts a query command without specifying parameters so that the previously transmitted parameters are used for the current query (415). Since the same parameters for the query are not transmitted again, it is faster to issue the query command to repeat the previous query than to issue the query command with all the parameters. In response to the new query command, each of the Tags in state A then individually and randomly decides whether or not to reply to the query command such that a probability of replying is in accordance with the value of the Q parameter (403).

When the value of Q parameter is adjusted to a suitable value, the probability of obtaining one legible reply from a large number of Tags will be high. Thus, the Reader can simply repeat the previous query without adjusting query parameters until there are too few (or too many) replies.

When one legible reply is received (417), the Reader communicates with the Tag which provides the reply (419). In one embodiment of the present invention, the reply from the Tag includes data that identifies the Tag so that the Reader can address the Tag that provides the legible reply. In one embodiment, a Tag generates a random number for the purpose of handshaking with the Reader. During the communication with the Tag, the Reader obtains Tag Identification data from the Tag. If the communication with the Tag is successful (421), the Tag switches from state A into state B (423); otherwise, the Tag remains in state A (425). Once the Tag is in state B, the Tag does not respond to the query for Tags in state A. Thus, the Reader can communicate with the Tags in state A one at a time until all Tags are in state B.

In one embodiment of the present invention, the operations with respect to state A and state B are symmetric. For example, the Reader can broadcast a query command with a specified value of Q parameter to Tags in state B. In response to the query command for Tags in state B, each of the Tags in state B individually and randomly decides whether or not to reply to the query command such that a probability of replying is in accordance with the value of the Q parameter. Tags in state A do not respond to the query for Tags in state B. If the communication with the Tag in state B is successful, the Tag switches from state B into state A; otherwise, the Tag remains in state B. Thus, the Reader can sort the Tags from state A into state B one at a time, or sort the Tags from state B into state A one at a time.

Alternatively, the operations with respect to state A and state B may be non-symmetric. For example, the Reader can sort the Tags from state A into state B one at a time but not from state B into state A one at a time. In such an implementation, the Reader can first place the Tags into state A before starting to read Tag data from Tags one at a time.

Figure 5:
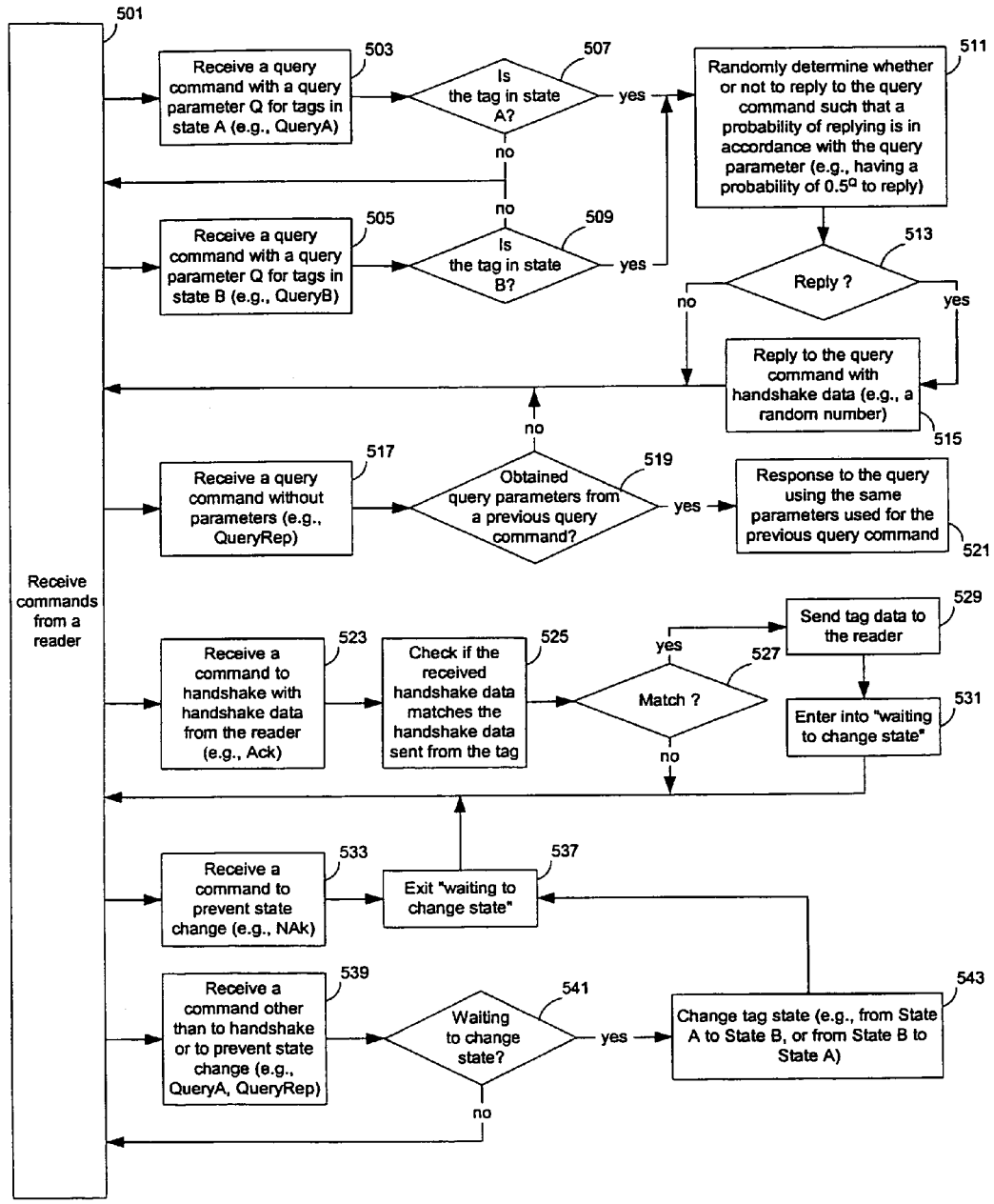
FIG. 5 illustrates a flowchart representation of a method for a Tag to communicate with a Reader according to one embodiment of the present invention.

FIG. 5 illustrates a flowchart representation of a method for a Tag to communicate with a Reader according to one embodiment of the present invention. In operation 501, the Tag receives commands from a Reader. After receiving a query command with a query parameter Q for Tags in state A (e.g., QueryA) (503), the Tag determines if it is in state A (507). If the Tag is not in state A, the Tag does not reply to the query for Tags in state A.

Similarly, after receiving a query command with a query parameter Q for Tags in state B (e.g., QueryB) (505), the Tag determines if it is in state B (507). If the Tag is not in state B, the Tag does not reply to the query for Tags in state B.

If the query matches the state of the Tag (e.g., the Tag in state A receives a query for Tags in state A or the Tag in state B receives a query for Tags in state B), the Tag randomly determines whether or not to reply to the query command such that a probability of replying is in accordance with the query parameter (e.g., having a probability of $0.5^Q$ to reply). If the Tag decides to reply (513), the Tag replies to the query command with handshake data (e.g., a random number).

When the Tag receives a query command without parameters (e.g., QueryRep) (517), it is determined whether the Tag obtained query parameters from a previous query command (519). If the Tag has the query parameters from a previous query command (e.g., a previous QueryA or QueryB command), the Tag responds to the query using the same parameters that were used for the previous query command (521). For example, if the previous query command is for Tags in state A, the current query command without parameters is also for Tags in state A. Thus, operation 507 is performed to check if the query is intended for the Tag. Similarly, if the previous query command is for Tags in state B, the current query command without parameters is also for Tags in state B so that operation 509 is performed. The Q parameter used in processing the previous query command is also used for the processing of the current query command without parameters. In one embodiment of the present invention, when a suitable value of Q parameter is reached, the Reader issues many query commands without parameters to repeat the query of the same parameters. Since the query command without parameters is quick to transmit (and quick to process), the time to process a large number of Tags can be shortened using such a query command without parameters.

When the Tag receives a command to handshake with handshake data from the Reader (e.g., Ack) (523), the Tag checks if the received handshake data matches the handshake data sent from the Tag (525). If the handshake data do not match (527) (e.g., the handshake command is not in response to a reply sent from the Tag or the handshake data received from the Reader is different from the handshake data sent from the Tag), the Tag does not reply. Otherwise, the Tag sends Tag data (e.g., ePC) to the Reader (529) and enters into "waiting to change state" (531). In one embodiment, the Tag assumes that the Reader receives the Tag data unless the Reader transmits a command to indicate that the Tag data is not received. For example, when the Tag receives a command to prevent state change (e.g., NAk) (533), the Tag exits "waiting to change state" (537). When the Tag receives a command other than to handshake or to prevent state change (e.g., receiving QueryA, QueryB or QueryRep) (539), the Tag changes Tag state (e.g., from State A to State B, or from State B to State A) (543) if the Tag is waiting to change state (541). In another embodiment, the Tag always assumes that the Reader receives the Tag data. The Tag changes its state from A to B, or from B to A, if a query command is received while it is waiting to change state after sending the Tag data. It is understood that operations 541 and 543 are performed before operation 507 or 509 is performed. Thus, after replying to a query for tags in state A and sending the Tag data, the tag in state A switches into state B and does not reply to a further query for tags in state A. To prevent the Tag from changing state, the Reader can broadcast a command to prevent state change (e.g., NAk) before another query command.

Figure 6:
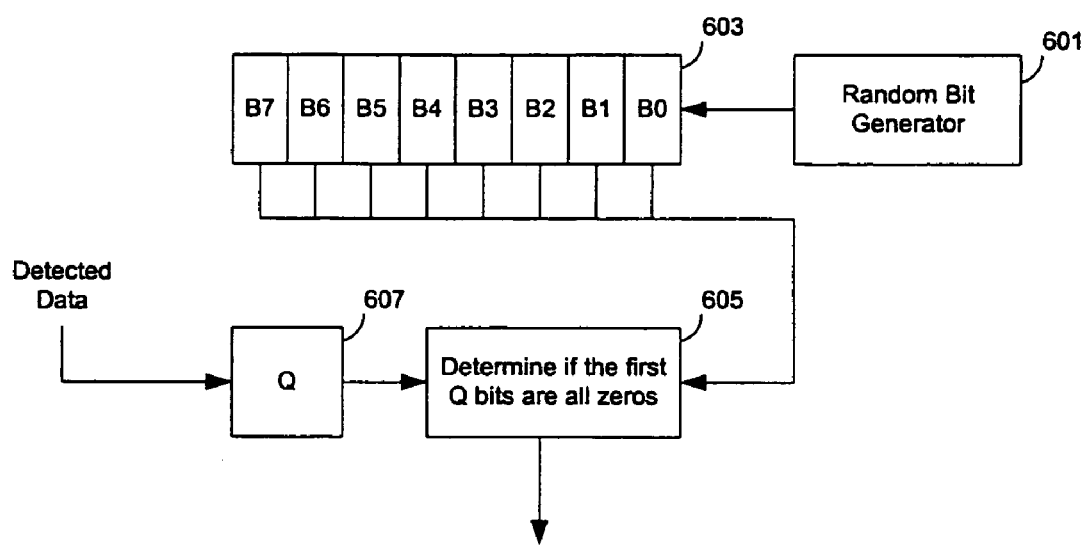
FIG. 6 shows an example of a decision making circuit for a Tag to randomly decide whether or not to reply to a query according to one embodiment of the present invention.

FIG. 6 shows an example of a decision making circuit for a Tag to randomly decide whether or not to reply to a query according to one embodiment of the present invention. A random bit generator (601) generates one bit of random information at a time. A number of random bits are stored in memory 603. For example, when a new bit of random information is generated, it is shifted into the memory so that the first bit in the memory contains the new bit of random information and the oldest bit of random information is discarded. When the Tag received the Q parameter from the Reader (e.g., in a QueryA command or a QueryB command), the value of the Q parameter is stored in memory 607. A logic circuit (605) determines if the first Q bits (e.g., the most recent Q bits) in memory 603 are all zeros. If the first Q bits in memory 603 are all zeros, the Tag decides to reply to the query. Otherwise, the Tag does not reply. When Q is zero, the Tag always decides to reply if the Tag is in the specified state.

In one embodiment, the random bit generator (601) has a probability of ($\frac{1}{2}$) to generate zeros. Thus, for a given Q value, the probability to reply is $(\frac{1}{2})^Q$. The random bit generator (601) may generate random bits at a rate of one bit per command, faster than one bit per command, or slightly slower than one bit per command. It is understood that different Tags may generate the random bits at different rates. Further, the random bit generator (601) may not generate zeros with a probability of ($\frac{1}{2}$). For example, important Tags may be biased to have a probability greater than $\frac{1}{2}$ to generate zeros. Thus, these Tags are more likely to satisfy requirement that the first Q bits are all zeros. As a result, these Tags have a greater probability to reply earlier than other Tags.

From the above example, it is understood that the Tag can randomly decide to reply with a probability of replying controlled by the Q parameter. Different implementations can be used to achieve such controlled random decision making; For example, it may be requested that the oldest Q bits in the memory are all ones. Since adjusting the value of the Q parameter can adjust the probability of replying, a Reader can adaptively adjust the Q value to increase the probability of getting a single legible reply from a large number of Tags that are in the range of the Reader.

Figure 7:
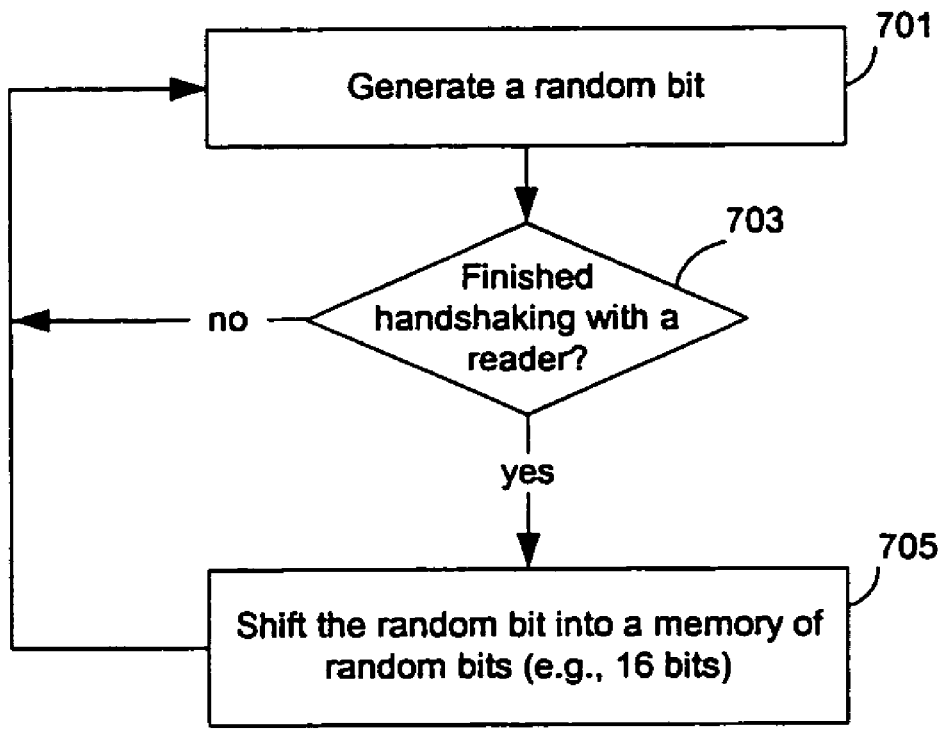
FIG. 7 shows a flowchart representation of a method for a Tag to generate random numbers for communication with a Reader according to one embodiment of the present invention.

FIG. 7 shows a flowchart representation of a method for a Tag to generate random numbers for communication with a Reader according to one embodiment of the present invention. Operation 701 generates a random bit (e.g., using a random bit generator 601). It is then determined whether the Tag has finished handshaking with a Reader (703). If the Tag is in the process of handshaking with the Reader, the random bit is not used to update the information in the memory (e.g. 603). Thus, the random number in the memory remains the same during the process of handshaking. In the process of handshaking, the Tag sends the content of the memory of random bits (e.g., 16-bit memory) to the Reader as the handshake data and receives a handshake command (e.g., Ack) with handshake data back from the Reader. If the handshake data received from the Reader matches the handshake data sent from and maintained at the Tag, handshaking is successful and the Tag can send the Tag data to the Reader in response. If the Reader does not send the handshake command again (or the handshake data does not match), the Tag finishes handshaking with the Reader (e.g., by sending another query command). When the Tag is not handshaking with the Reader, the Tag does not need to freeze the content of the memory of random bits. Thus, the Tag shifts the random bit into the memory of random bits (705) to update the content. Based on this description, a person skilled in the art can envision various alternative implementations. For example, the random bit may be generated only in response to a query command.

In one embodiment of the present invention, the entire content of the memory of random bits (e.g., 603) that is used for making the random decision is used as the handshake data. Alternatively, only a portion of it may be used as the handshake data. For example, when the Tag replies if the first Q bits are all zeros, the Tag may use only the last (16-Q) bits of the random bit memory as handshake data. Alternatively, the Tag may use other random numbers as the handshake data.

Figure 8:
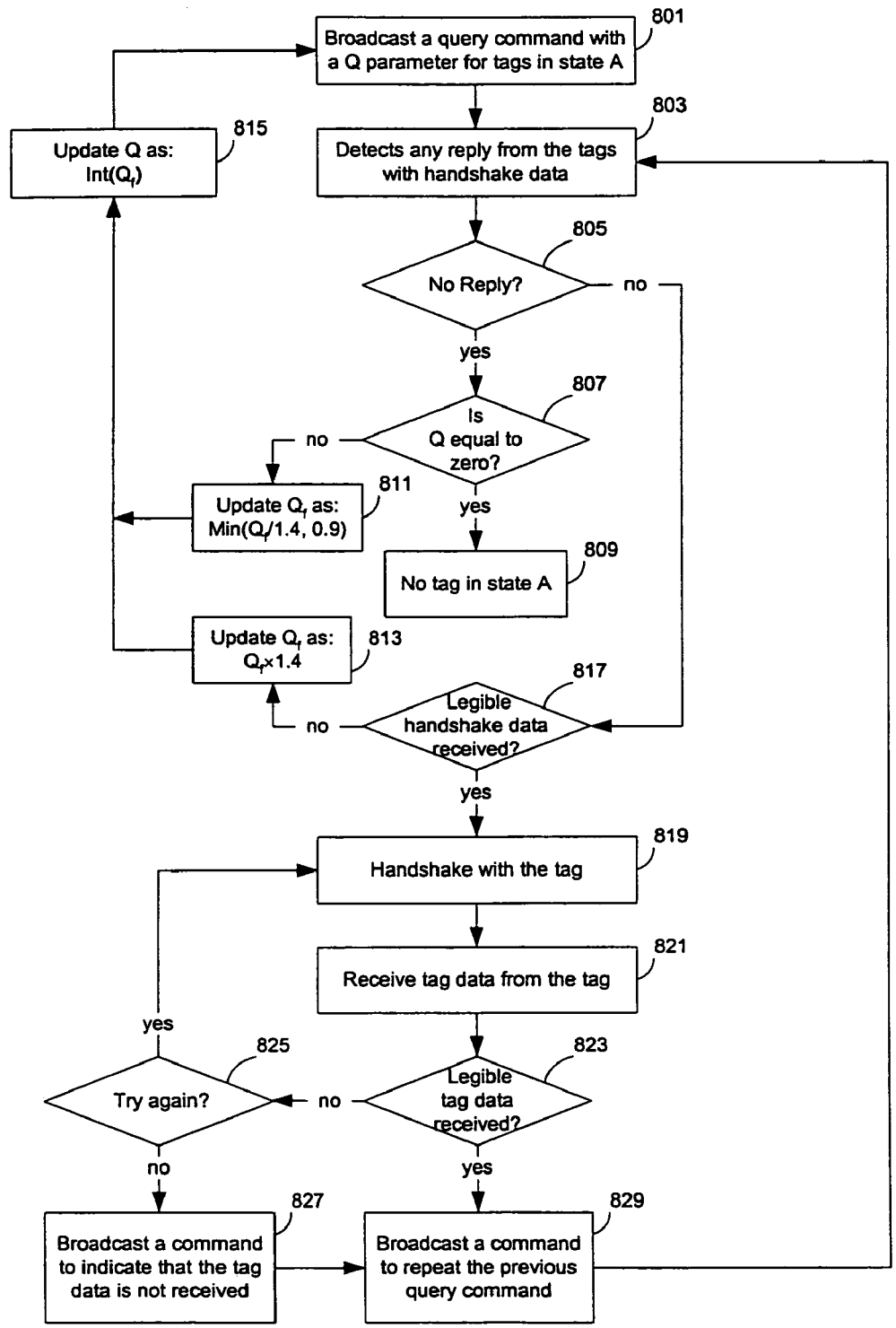
FIG. 8 illustrates a flowchart representation of a method for a Reader to read Tag data from a number of Tags according to one embodiment of the present invention.

FIG. 8 illustrates a flowchart representation of a method for a Reader to read Tag data from a number of Tags according to one embodiment of the present invention. After broadcasting a query command with a Q parameter for Tags in state A (801), a Reader detects any reply from the Tags with handshake data (803). When there is no reply (805), it is determined whether the Q parameter is already equal to zero. If the Q parameter is equal zero and no reply is received in response to the query command, it can be determined that there is no Tag in state A within range, since any Tag in state A receiving the query command will reply when the Q parameter is equal to zero. If the Q parameter is not already zero, the Reader can reduce the Q parameter to increase the probability of receiving a reply. For example, the Reader can maintain a parameter $Q_f$ as a floating-point number so that Q is determined from Int($Q_f$) (where Int(x) indicates the integer portion of a real number x). The Reader can update $Q_f$ as Min($Q_f$/1.4, 0.9) (where Min(x/a, b) indicates the minimum value between x/a and b), and update Q as Int(Q) (811, 815), when there is no reply. When there are multiple replies from different Tags that corrupt each other, the Reader cannot obtain legible handshake data from the replies (817). To avoid collision, the Reader can increase the Q parameter to decrease the probability of receiving multiple replies. For example, the Reader can update $Q_f$ as $Q_f \times 1.4$ and update Q as Int(Q) (813, 815) when multiple replies collide to corrupt each other.

Note that when the Reader can obtain legible handshake data from one reply, the Reader does not have to increase the Q parameter even if there is collision. For example, when a weak reply collides with a strong reply, the Reader can still obtain the handshake data from the strong reply. In this case, the Reader can simply ignore the weak reply and start to handshake with the Tag that sends the strong reply. Thus, hidden collisions improve performance, since weak Tags are protected by the ACK handshake and the stronger Tag is still counted if the Reader can extract its handshake.

After legible handshake data is received as reply to the query command (817), the Reader handshakes with the Tag that sends the handshake data (e.g., by broadcasting a command, such as Ack, with the handshake data). Then, the Reader tries to receive Tag data (e.g., Tag identification data, such as ePC) from the Tag (821). For example, if the Tag determines that the handshake data in the Ack command matches the handshake data sent from the Tag, the Tag transmits the Tag identification data as a reply to the Ack command. If the reader receives legible Tag data (823), the reader can broadcast a command to repeat the previous query command without re-broadcasting the parameters for the query (829). In response to the query command, the Tag that just sent the Tag data switches from state A to state B so that it does not respond to the query for Tags in state A. The Tags in state A use the previous query parameters for the current query. However, if the Tag data is not legible (823), the Reader may try again to handshake with the Tag (819) or broadcast a command to indicate that the Tag data is not received (827).

In one embodiment of the present invention, the Tag switches state in response to any query commands after transmitting the Tag data. Thus, after receiving the legible Tag data, the Reader can choose to broadcast a command to repeat the previous query or to broadcast a query command with new query parameters. Alternatively, the Tag can be implemented such that it switches state, after transmitting the Tag data, only in response to the command that repeats the previous query command (e.g., QueryRep). Thus, the Reader can use one QueryRep command to cause: 1) the Tag that has just sent the Tag data to switch state to leave the set of Tags to be interrogated; and 2) other Tags to be queried and to make random decisions about whether or not to reply to the query.

In one implementation of the present invention, system communication follows a two-stage command-reply pattern where the Reader initiates the transaction (Reader Talks First, RTF). In the first phase, the Reader provides power to one or more passive Tags with continuous wave (CW) RF energy. Tags power up, ready to process commands after receiving one command that is used for synchronization of their clocks. The Reader transmits information to the field by amplitude modulation using the Reader-to-Tag encoding scheme described below. On completion of the transmission, the Reader ceases modulation and maintains RF to power the Tags during the reply phase. Tags communicate with the Reader via backscatter modulation during this period using the four (4)-phase bit encoding scheme described below.

In one implementation, basic commands are designed to limit the amount of state information the Tags have to store between transactions. The power available to a passive Tag is a complicated function of transmitted power, Tag/Reader antenna orientations, local environment and external sources of interference. Tags on the margin of the RF field are powered unreliably and therefore cannot be counted on to maintain a memory of previous transactions with the Reader. In particular, moving Tags or objects may cause the Tag to have power only for brief intervals, primarily due to multi-path interference. In one implementation; it is designed to allow the efficient counting of Tags under these conditions by minimizing the total transaction time and by allowing rapid recovery from missed commands. Tags which have threshold power and receive three commands (e.g., a prior command to spin up on, a query, and an ACK with its reply) in as little as three milliseconds can be inventoried.

In one implementation, there is only one bit of state for each session, between command groups, and the impact of that state is further lessened by symmetrizing the command set about those two states, as described below.

In one implementation, each Tag has four sessions available, each with a single bit of independent state memory. The backscatter mode and data rate are the same for all of the sessions, and the random reply register is the same for all sessions. The state of being selected is also the same for all sessions. This session structure allows up to four Readers or processes to communicate with the Tag population in a multitasking environment, but they can do so with a complete command group. A command group starts with a QueryA/B (QueryRep does not start a command group), and continues through an ACK, and ends with either the command after the ACK (which completes the transaction from the Tag's point of view), or at the end of the use of the SELECTED state by a process.

One example of the use of two sessions is a portal Reader which is counting all Tags coming through a portal, but wants to preferentially count pallets. It could then run two simultaneous processes on the Tag population. Session 0, for example, could be used by one process to sweep the entire population of Tags between state A and state B to ensure counting all Tags that it touches once, regardless of their former state. Session 1 could selectively mask all pallet Tags to state A for that session and all other Tags to state B, and count them preferentially in an interleaved process, without interfering with the ongoing inventory in the first process.

A similar example would be a set of store inventory Readers set to synchronize their inventory type. For example, all inventory Readers would use Session 0 at the Tags to inventory from the A state to the B state for a ten second interval, and then inventory from the B state back to the A state. This ensures that all Tags are counted by one inventory Reader once per cycle. Simultaneously, a handheld Reader could use session 1 to look for a specific ePC by masking a sufficient portion of that ePC to state A while masking all other Tags to state B. It then uses Session 1 QueryA commands to seek that Tag or Tag type. This avoids interference with the store inventory Readers as long as command groups do not collide (interleave) and as long as RF interference is avoided.

Figure 9:
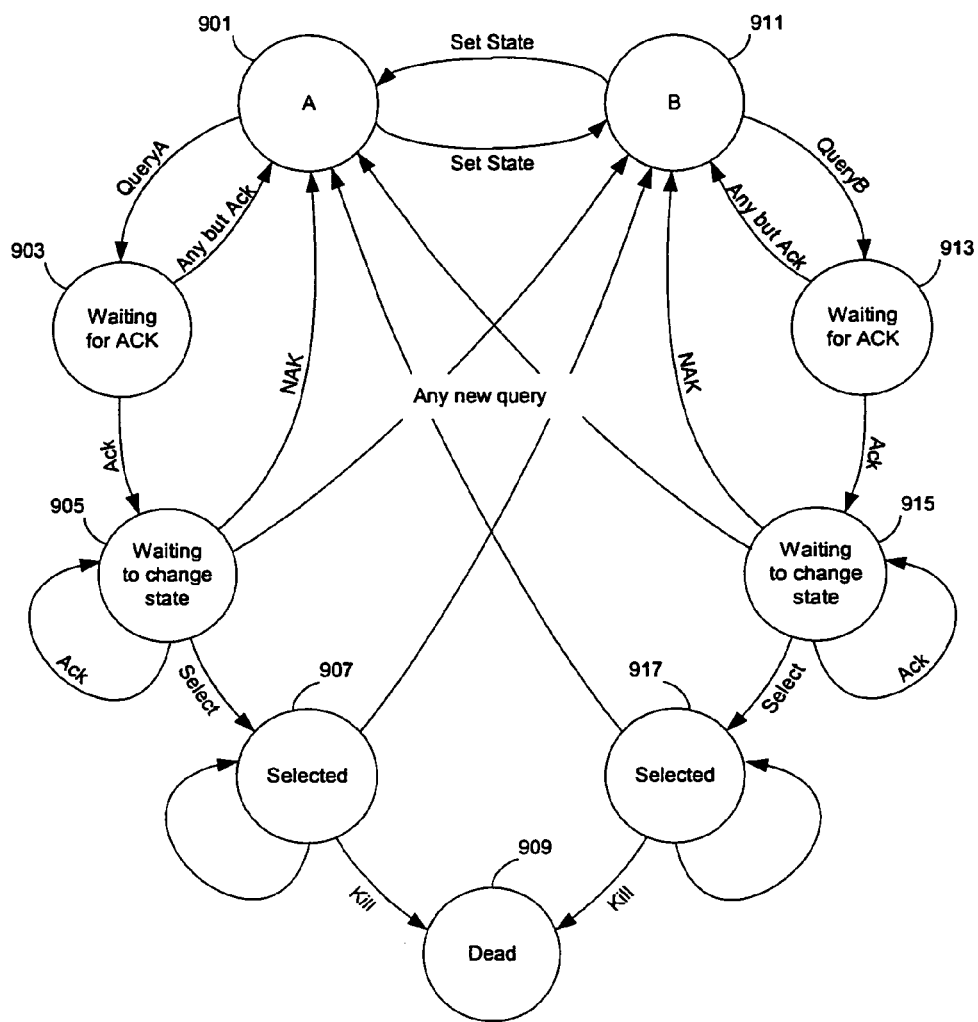
FIG. 9 illustrates a Tag state diagram according to one embodiment of the present invention.

FIG. 9 illustrates a Tag state diagram according to one embodiment of the present invention. The Tag state diagram shows the states that a Tag may take within command groups. A command group is a set of sequential commands which start with a QueryA/B command and end with the Tag leaving the selected or acknowledge state. Between Tag groups, the state in each session is A or B. The DEAD state is a permanent state. For Session 0, states A and B are persistent states, even in the absence of power. After a long period of time, at least one second but possibly hours, state B reverts to state A. In state A, all Tags respond to QueryA commands but not QueryB commands. In state B, QueryB commands are responded to, but not QueryA commands. If the state memory has expired for a particular session, the Tag enters into state A upon power up for that session.

Sessions other than the 0 Session may not have a persistent A-B flag, and may remember their state only while power is available. If their state is lost; the state for that session reverts to state A.

Upon power up, the Tag resets all of its internal state except for the state flags for each of the 4 sessions. The Tag synchronizes its clock to the rising edges of the sync bits provided by the first command, but is not allowed to act upon the first command after power up. It maintains its clock with sufficient accuracy to decode the next command. If clock frequency needs to be corrected by more than 20% during any command spinup, the Tag does not respond to that command but waits until the next QueryA or QueryB command. This is designed to prevent inappropriate and possibly interfering responses.

For each session, while a Tag is in state A, it responds to QueryA commands but not QueryB commands. A Tag enters into state A upon the appropriate SetState command, and upon successful completion of an inventory handshake starting with a QueryB.

For each session, while a Tag is in state B, it responds to QueryB commands but not QueryA commands. A Tag enters into state B upon the appropriate SetState commands, and upon successful completion of an inventory handshake started from a QueryA. A Tag may remain in state B for session zero (0) even with loss of power of up to 1 second.

For each independent session, if the state memory for state B is lost, the Tag powers up in state A.

The Dead State is a permanent change in the state of the Tag state entered on receipt of a valid Kill Command and Kill Code sequence. The Dead state is implemented by a permanent change in the physical Tag, such as programming $E^2$ or blowing a fuse.

Some embodiments of the present invention relates to RFID protocol for achieving a fast, robust; compatible and extensible protocol for various classes of RFID Tags, while allowing very inexpensive implementations for both Tags and Readers. In one embodiment, the RF transport layer focuses on UHF operations; for example, the protocol can be applicable from 400 MHz to 2.45 GHz.

There are at least four classes of Tags for different applications and cost requirements. Tags of different classes that meet the requirements of all of the design layers are able to work together. Tags may also include a standardized wired I/O interface to sensors, clocks, displays and other devices.

Class I Tags are simple passive, read-only backscatter Tags, designed for lowest cost production. Class I Tags have a one-time programmable memory, write once identity memory, 64 or 96-bit ePC Code, and optional recycling code.

Class II Tags are passive backscatter Tags with higher functionality and cost than Class I. In addition to the Class I features, Class II Tags: can write and read data into and out of Tags, have read-write memory, may have battery power for non-communication purposes, and optionally have sensors and data loggers.

Class III Tags are semi-passive backscatter Tags. In addition to class II features, class III Tags have a built-in battery or other energy source to support increased read range.

Class IV Tags are modern-like semi-passive or active (transmitter) Tags that can wirelessly communicate with each other and/or other devices. Class IV Tags may also emulate the class I-III Tags in communication with Readers.

RFID systems according to one implementation of the present invention have features including: identification of single Tags in the field of a Reader, anti-collision functionality to manage reading of multiple Tags in the field of a Reader, error management in the system from sources of RF interference and marginal Tags, operations in compliance with local RF regulatory requirements, and coexistence with systems operating in compliance with local RF regulatory requirements.

Some detailed examples are provided below. However, according to this description, different detailed designs and implementations can be envisioned by those skilled in the art. Overall system architecture is typically a function of the marketplace.

In the following description, references to bits in the memory of RFID Tags are made. When referring to bits in Tag memory, the words "up" or "higher" generally refer to the Most Significant Bit (MSB) direction and the words "down" or "lower" to the Least Significant Bit (LSB) direction. For example, the binary representation of the decimal number seven (7) is 0111. Shifting each bit "up" or "higher" by one yields the decimal number fourteen (14), represented in binary as, 1110.

In one embodiment of the present invention, the command format is designed to support very low cost (VLC) Tags. The Reader performs extra work, allowing the Tags to be as simple and inexpensive as possible. This falls largely into two areas, dealing with timing uncertainty and dealing with limited long term memory in the Tags. However, other types of Tags (e.g., Class III and higher Tags, such as battery powered devices with large memories) may also support these command formats (e.g., for compatibility reasons).

VLC, single-chip Tags typically have limited oscillator stability, since quartz crystals are cost and size prohibitive. In one embodiment, the Tags use the bit timing of commands to synchronize their internal clock, and need to be powered up and see one full command packet before they can start decoding further commands. Replies from these Tags are structured such that the Reader can interpret the information transmitted by the Tags at whatever clock rate the Tag is able to provide. This scheme is similar in concept to auto-synchronization schemes used in magnetic card or barcode Readers.

In one implementation, three classes of commands are provided, including basic commands, programming commands and data link commands. Basic commands provide object identification, sorting, inventory, etc. Programming commands support Tag data initialization and programming by the Tag manufacturers prior to Tagged items entering the supply chain. Data link commands provide a data link layer for class II and higher Tags.

One embodiment of the present invention uses Huffman encoded commands, for example, 18 bits for Query A/B (with 4 bit Q), 6 bits for QueryRep (last query repeat), 23 bits for ACK (including 16 bits of data), 13 bits for NAK (used Rarely, e.g., on data errors) and 13 bits or more for parameters of other commands. Thus, a QueryRep command is substantially shorter than a QueryA or a QueryB command.

Detailed examples of command structure in one implementation are described below. In the following examples of command structures, the command fields are generally listed in the order in which they are transmitted.

In one implementation, there are three types of inventory commands, query, ACK and NAK. A Query command starts a transaction, to which one or more Tags respond with a random 16-bit number. If the Reader successfully extracts a 16-bit number, it is sent back to the Tag for handshaking through an ACK command. A Tag only responds if the 16-bit number sent by the ACK command matches the number that the Tag sent. A Tag which has its 16-bit random number confirmed then replies with a prefix, its CRC (Cyclic Redundancy Check) and its ePC (Electronic Product Code). The Tag then transitions its internal state for that session from A to B (or from B to A) unless it gets a NAK. If it receives a NAK, it stays in the former state.

In one implementation, the Reader transmits spinup bits first. Within each field, the LSB (Least Significant Bit) is transmitted first. Every command is preceded by four Manchester zero bits to enable clock spinup. The clock spinup bits are followed by a Manchester high violation, command bits and parameters which vary from command to command. If the Tag clock setting mechanism is required to adjust the clock by more than 20%, or if the Tag does not see the spinup bits or Manchester high violation, the Tag ignores the command except for the purpose of improving its clock sync. If any command does not match the data pattern of a valid command, the Tag does not change its internal state, and does not modulate its backscatter. At the start of every command, the Tag refreshes the state memory for each of its four sessions. If the Tag is starting up from a power on reset, it enters the "Awaiting first query" state.

When the Tag is reset through "Power On," the Tag always enters into the state of "Awaiting first query."

When the clock is not synchronized, or the clock changed by more than 20%, or spinups or the Manchester violation have not been seen, or bad command bits or bad CRC data is received, a bad command is received at the Tag. When the starting state condition is in "Awaiting first query," "Ready," or "Selected," the Tag remains in the same state condition in response to a bad command. When the starting state condition is "Waiting for ACK" or "Acknowledged," a bad command causes the Tag to enter into the state of "Ready."

A QueryA command has parameters which include a session number, backscatter mode and the relative Tag to Reader data rate. It has a data payload which is a number Q. When a Tag receives the QueryA command, if it is in state A for that session, it responds with a probability of $(1/2)^Q$. The Tag responds to each query with an independent $(1/2)^Q$ probability. In one embodiment, the reply from the Tag contains 16 random bits which the Tag also remembers until the next command.

For example, a QueryA command may include spinup bits (4-bit, "0000"), Manchester high violation (1-bit), Command bits (1-bit, "0"), Session number [S] (2-bit), A/B flag (1-bit, "0" for QueryA and "1" for QueryB), Backscatter mode [M] (2-bit), Backscatter relative rate [R] (2-bit) and Q parameter [Q] (4-bit). Bit masking can be used for large populations as described below.

In response to a QueryA command, a Tag: 1) sets the session number to [S]; 2) sets the state flag for query to "A"; 3) sets the Q parameter to [Q]; 4) sets the Backscatter mode to [M]; and, 5) sets the Backscatter Rate to [R]. The Tag computes a random number and makes random decision according to [Q]. In addition, if the Tag is in the starting state of "Selected" or "Acknowledged", the Tag switches to state B if it is in state A and to state A if it is in state B. Then, if the Tag is in state A, and the random decision is positive, the Tag replies with the random number and enters into the state of "Waiting for ACK"; otherwise, the Tag enters into the state of "Ready."

A QueryB command is symmetric to a QueryA command with respect to state A and B. A successful completion of a handshake cycle after a QueryB command places the Tag into state B for that session. The Tag reply to a QueryB command is in the same format as to a QueryA command.

For example, a QueryB command may include spinup bits (4-bit, "0000"), Manchester high violation (1-bit), Command bits (1-bit, "0"), Session number [S] (2-bit), A/B flag (1-bit, "0" for QueryA and "1" for QueryB), Backscatter mode [M] (2-bit), Backscatter relative rate [R] (2-bit) and Q parameter [Q] (4-bit). Bit masking can be used for large population as described below.

In response to a QueryB command, a Tag: 1) sets session number to [S]; 2) sets state flag for query to "B"; 3) sets the Q parameter to [Q]; 4) sets the Backscatter mode to [M]; and, 5) sets the Backscatter Rate to [R]. The Tag computes a random number and makes a random decision according to [Q]. In addition, if the Tag is in the starting state of "Selected" or "Acknowledged", the Tag switches to state B if it is in state A and to state A if it is in state B. Then, if the Tag is in state B and the random decision is positive, the Tag replies with the random number and enters into the state of "Waiting for ACK"; otherwise, the Tag enters into the state of "Ready."

A QueryRep command repeats the last query with the same parameters. If the Tag has not seen a QueryA/B since power on reset, it does not respond to a QueryRep. This command is typically the most common command except in the complete atomic mode. The Tag reply to a QueryRep is in the same format as that for a QueryA or QueryB command.

For example, a QueryRep command may include spinup bits (4-bit, "0000"), Manchester high violation (1-bit), and, Command bits (1-bit, "0").

In response to a QueryRep command, a Tag in the state of "Awaiting first query" does not reply and remains in the state of "Awaiting first query." A Tag in the state of "Acknowledged" or "Selected" does not reply, switches to state B if it is in state A and to state A if it is in state B, and enters into the state of "Ready". A Tag in the state of "Ready" or "Selected": 1) computes a random number and makes random decision according to [Q]; 2) checks if the state of the Tag matches the state flag of the query (e.g., state flag for query is "A" while the Tag is in state A or state flag for query is "B" while the Tag is in state B); and, 3) if the state of the Tag matches the state flag for query and the random decision is positive, replies with the random number and enters into the state of "Waiting for ACK". If the state of the Tag does not match the state flag for query or the random decision is negative, the Tag does not reply and enters into the state of "Ready."

In one embodiment, a reply from a Tag in response to a query command (e.g., QueryA, QueryB or QueryRep) contains 16-bit handshake data in the currently set backscatter mode, and at the currently set backscatter rate. (Both are set by a QueryA or QueryB command). They send a one, followed by a crowbar off for one bit period, 16 bits of random data, followed by another crowbar off period, and a trailing 1.

For example, a reply from a Tag in response to a query command may include TAGSPINUP (1-bit, "1"), High violation (Crowbar off for backscatter modulation bit period), Tag handshake (16-bit, Random data), High violation (Crowbar off for backscatter modulation bit period) and TAGTRAILER (1-bit, "1").

An ACK command is sent by the Reader when it successfully extracts the handshake from a Tag reply. The ACK follows immediately after a Query command, without intervening commands except other ACKs. It also follows within time $T_{coast}$ (defined below), together considered as an atomic "command" of the protocol. If the ACK command received by the Tag does not contain the handshake that it replied to the immediately preceding Query, it does not reply.

For example, an ACK command may include spinup bits (4-bit, "0000"), Manchester high violation (1-bit), command bits (2-bit, "10") and Handshake data (16-bit, the data that was sent to the Reader in the immediately preceding query).

In response to an ACK command, a Tag in the starting state of "Awaiting first query" does not reply and remains in the state of "Awaiting first query." A Tag in the starting state of "Ready" or "Selected" does not reply and enters into the state of "Ready." A Tag in the starting state of "Waiting for ACK" or "Acknowledged" checks if the handshake data in the ACK command matches the random number sent to the Reader in the immediately preceding query. If there is a match, the Tag scrolls back ePC and CRC as a reply and enters into the state of "Acknowledged"; otherwise, the Tag enters into the state of "Ready."

A reply in response to an ACK command contains ePC and CRC. Tags matching their 16-bit handshake to that sent by the Reader reply in the currently set backscatter mode, and at the currently set backscatter rate. (Both are set by a QueryA or QueryB command). They respond by sending four (4) one (1) bits followed by a high violation for one Reader to Tag bit time, and all the identification data in the Tag starting at bit 0. Data sent by the Reader to the Tag may be of variable length. The data is followed by a crowbar off (high) violation, and four trailing ones (1)s.

For example, a reply from a Tag in response to an ACK command may include TAGSPINUP (4-bit, "1111"), High violation (Crowbar off for backscatter modulation bit period), Tag data (variable size, ePC, CRC, recycling data, etc) High violation and TAGTRAILER (4-bit, "1111").

If a Reader does not receive a response to an ACK, the Reader transmits a NAK. If it receives a garbled response to an ACK, it may transmit a NAK or try an ACK again. The NAK (or any command other than a Query, a repeat ACK, or select) is used to signal a Tag that it has not been recorded, and should stay in its former (A or B) state.

In a query-ACK inventory, NAK is used only upon data error. The NAK command also ends the SELECTED state. There is no reply to a NAK. For example, a NAK command may include spinup bits (4-bit, "0000"), Manchester high violation (1-bit), and command bits (8-bit, "11000000").

In response to a NAC command, a Tag in the starting state of "Awaiting first query" does not reply and remains in the state of "Awaiting first query." A Tag in the starting state of "Ready", "Selected", "Waiting for ACK", or "Acknowledged" does not reply and enters into the state of "Ready".

A SetState command is used to restrict searches and for direct addressing and masking, including various set operations (e.g., union). Set operations are performed by using SetState commands. Masking would start by picking an unused session, and then setting all of the Tags to the desired state in that session by issuing a string of SetState commands. Tags whose state is changed respond with the ScrollID preamble, enabling applications which maintain an inventory by simply individually changing the state of each Tag previously known to be in the field, and using the presence or absence of a reply to update their inventory before executing a random inventory for new Tags.

For example, a SetState command may include spinup bits (4-bit, "0000") Manchester high violation (1-bit), command bits (8-bit, "11000001"), Session number [S] (2-bit), State flag (1-bit), Tag manipulation flags (2-bit, "00" for setting the state if the mask is matched and setting opposite state if not matched, "10" for setting the state if the mask is matched and doing nothing if not matched, "11" for setting the state if the mask is not matched and doing nothing if matched), Pointer (8-bit), Length (8-bit, Length of mask bits), Mask bits (variable size), and CRC8 (8-bit, calculated from the first command bit through the last mask bit).

In response to a SetState command, a Tag in the starting state of "Awaiting first query" remains in the state of "Awaiting first query." A Tag in the starting state of "Ready", "Selected", "Waiting for ACK", or "Acknowledged" enters into the state of "Ready". In response to the SetState ACK command, a Tag sets the session number to [S] and the AB state of the session to "A" or "B" depending on the mask. When the mask matches, the Tag sends a positive reply; otherwise, the Tag does not reply. If the state flag is "A" and the state manipulation flags are "00," the AB state of the session is set to "A" if the mask matches and to "B" if the mask does not match. If the state flag is "A" and the state manipulation flags are "01"), there is no action. If the state flag is "A" and the state manipulation flags are "10", the AB state of the session is set to "A" if the mask matches and there is no action if the mask does not match. If the state flag is "A" and the state manipulation flags are "11", the AB state of the session is set to "A" if the mask does not match and there is no action if the mask does not match. If the state flag is "B" and the state manipulation flags are "00," the AB state of the session is set to "B" if the mask matches and to "A" if the mask does not match. If the state flag is "B" and the state manipulation flags are "01"), there is no action. If the state flag is "B" and state manipulation flags are "10", the AB state of the session is set to "B" if the mask matches and there is no action if the mask does not match. If the state flag is "B" and the state manipulation flags are "11", the AB state of the session is set to "B" if the mask does not match and there is no action if the mask does not match.

Tags matching their data to the mask sent by the Reader reply in the currently set backscatter mode, and at the currently set backscatter rate (both are set by a QueryA or QueryB command). They send a one, followed by a crowbar off for one bit period, 16 bits of data, followed by another crowbar off period, and a trailing 1.

For example, a reply to a SetState command may include TAGSPINUP (1-bit, "1"), High violation (Crowbar off for backscatter modulation bit period), Tag confirm (16-bit, "0101010101010101"), High violation (Crowbar off for backscatter modulation bit period), and TAGTRAILER (1-bit, "1").

A SELECT command is an addressing command. The SELECTED state is held in volatile memory and is cleared at power on reset, and also cleared by the use of any Query command. Programming and class II or higher commands are divided into addressing (SELECT) and data exchange parts to allow the Tag communications hardware and registers used for addressing to be reused for reading and writing. The Tag is in the "Selected" state to execute KILL, ProgramID, VerifyID, LockID, and Read and Write. (Select is only used to Kill, Program and LockID in class I Tags).

For example, a SELECT command may include spinup bits (4-bit, "0000"), Manchester high violation (1-bit), command bits (8-bit, "11000010"), Session number (2-bit) and CRC8 (Calculated from the first command bit through the session number).

Tag addressing proceeds as follows:
1) Pick an open session.
2) Issue a mask for that session, specific enough to probably get only the desired Tag.
3) Search for the Tag using Query-ACK until you find the desired Tag (recognizing it by its complete ePC and CRC).
4) Issue the SELECT command.

In response to a SELECT command, a Tag in the starting state of "Awaiting first query" does not reply and remains in the state of "Awaiting first query." A Tag in the starting state of "Ready," "Selected," or "Waiting for ACK" does not reply and enters into the state of "Ready." A Tag in the starting state of "Acknowledged" provides a positive reply if the power is high enough for writing and a negative reply if the power is not high enough for writing, and enters into the state of "Selected."

Tags selected by the SELECT command reply in the currently set backscatter mode, and at the currently set backscatter rate (both are set by a QueryA or QueryB command). They send a one, followed by a crowbar off for one bit period, 16 bits of data, followed by another crowbar off period, and a trailing 1.

For example, a reply to a SELECT command may include TAGSPINUP (1-bit, "1"), High violation (Crowbar off for backscatter modulation bit period), Tag confirm (16-bit, "0000 0000 0000 0000 if power is not high enough to write, "0101 0101 0101 0101 if power is high enough to write), High violation (Crowbar off for backscatter modulation bit period) and TAGTRAILER (1-bit, "1").

A KILL command is addressed by the SELECTED address mode. Tags matching the kill code sent by the Reader in a [VALUE] field are deactivated and no longer respond to Reader queries. Any bits beyond the length of the kill code supported by the Tag are ignored except for the CRC calculation, and if all the bits in the Tag match the kill code, the kill command executes the appropriate kill. The KILL command may require higher field strengths from the Reader, and may therefore be a short-range operation. In one embodiment, the Reader transmits "1"s for 100 milliseconds, then 100 milliseconds of "0"s, followed by 15 "1"s and then another 100 milliseconds of "0"s after the kill code for the Tag to complete the command.

For example, a KILL command may include spinup bits (4-bit "0000"), Manchester high violation (1-bit), command bits (8-bit, "11000011"), Kill type (2-bit, "00" for complete kill (erase all data and permanently deactivate), "01" for preserve recycle (erase all but recycling field), "10" for cloak (set to unresponsive, but not erased)), Pointer (8-bit), Length (8-bit, Length of mask bits), Kill code (variable side), and CRC8 (8-bit, calculated over the bits from the first command bit through the full kill code, including any ignored bits of the kill code).

A Tag is first in the selected state for the kill command to be executed. Tags ignore kill code data beyond the length that it can handle. If the kill code matches the bits it does have, it executes kill. Longer kill code Tags are more secure and shorter kill code Tags may be less expensive to manufacture, but all Tags are compatible.

In response to a KILL command, a Tag in the starting state of "Selected" sets kill bits to DEAD without a reply and enters the "DEAD" state if the kill code is matched and the kill is successful. A Tag in the starting state of "Selected" sends a negative response and remains in the state of "Selected" if the kill code is matched but the kill is not successful. A Tag in the starting state of "Awaiting first query" does not reply and remains in the state of "Awaiting first query." A Tag in the starting state of "Ready," "Waiting for ACK "or" Acknowledged" does not reply and enters into the state of "Ready."

Only Tags which unsuccessfully attempt to execute a KILL command reply in the currently set backscatter mode, and at the currently set backscatter rate (both are set by a QueryA or QueryB command). They send a one, followed by a crowbar off for one bit period, 16 bits of data, followed by another crowbar off period, and a trailing 1.

For example, a reply to a KILL command may include TAGSPINUP (1-bit, "1"), High violation (Crowbar off for backscatter modulation bit period), Tag confirm (16-bit, "0000 0000 0000 0000 for Kill command failed), High violation (Crowbar off for backscatter modulation bit period), and TAGTRAILER (1-bit, "1").

A Tag is SELECTED to respond to a ScrollMFG command. For example, a ScrollMFG command may include spinup bits (4-bit "0000"), Manchester high violation (1-bit), command bits (8-bit, "11000100") and CRC8 (8-bit, calculated over all the command bits).

In response to a ScrollMFG command, a Tag in the starting state of "Selected" sends a reply and remains in the state of "Selected." A Tag in the starting state of "Awaiting first query" does not reply and remains in the state of "Awaiting first query." A Tag in the starting state of "Ready," "Waiting for ACK "or" Acknowledged" does not reply and enters into the state of "Ready."

Selected Tags reply to the ScrollMFG command by sending back the preamble, and the following data, which is never allowed to be programmable.

For example, a reply to a ScrollMFG command includes Preamble (4-bit, "0000"), High Manchester violation, MANUFACTURER (16-bit, assigned by "authorizing agency"), MASK SET/PRODUCT CODE (16-bit, manufacturer defined), DIE NUMBER (16-bit, manufacturer defined), CAPABILITY CODE (16-bit, assigned by "authorizing agency"), MEMORY SIZE (16, capability code dependent meaning), and CRC (16-bit, calculated over all the bits from the manufacturer to the last field transmitted). The ScrollMFG reply can optionally end at any field after the MANUFACTURER field.

Programming Commands use the same command structure and field definitions as the Basic Commands, but are typically issued only by a Tag programming device, or Programmer. A Tag Programmer may be similar to a Reader, with the exception that it can execute Programming Commands in addition to Basic Commands, in accordance with methods approved by Tag (and IC) manufacturers.

Programming Commands enable programming of the contents of the Tag memory, and verification of the contents of the Tag memory prior to locking the contents.

Manufacturers may define additional optional commands which are specifically used for manufacturing test only. For example, these commands may be required to have command codes in the range D7h to Dfh.

All Programming Commands are disabled once the Tag manufacturer has locked the Tag data contents. The specific timings for programming a Tag are memory technology dependent.

Tag programming is accomplished 16 bits at a time. Programming is typically allowed if the Tag has not been previously locked. If a Tag is not known to be cleared or of a type not needing an erase cycle before programming, EraseID is used before ProgramID.

The data is sent to the Tag using the ProgramID Command, where a [PTR] field is the memory row address to be programmed and a [VAL] field contains the 16 bits of data to be programmed into the selected memory row address.

Upon receipt of a valid ProgramID Command, the Tag executes the appropriate internal timing sequences required to program memory.

For example, a ProgramID Command may include spinup bits (4-bit "0000"), Manchester high violation (1-bit), command bits (8-bit, "11000101"), pointer (8-bit), Data Area (2-bit, "00" for CRC & ePC, "01" for user data (none for class I), "10" for kill code), Length (8-bit, Length of data), ID to program (variable size), and CRC8 (8-bit, calculated over all fields from the first command bit to the end of the ID).

In response to a ProgramID command, a Tag in the starting state of "Selected" writes data if it is not locked and remains in the state of "Selected." A Tag in the starting state of "Selected" sends a positive reply if successful and a negative reply if unsuccessful. A Tag in the starting state of "Awaiting first query" does not reply and remains in the state of "Awaiting first query." A Tag in the starting state of "Ready," "Waiting for ACK "or" Acknowledged" does not reply and enters into the state of "Ready."

Tags executing the ProgramID command reply in the currently set backscatter mode, and at the currently set backscatter rate. (Both are set by a QueryA or QueryB command). They send a one, followed by a crowbar off for one bit period, 16 bits of data, followed by another crowbar off period, and a trailing 1.

For example, a reply to a ProgramID command may include TAGSPINUP (1-bit, "1"), High violation (Crowbar off for backscatter modulation bit period), Tag confirm (16-bit, "0000 0000 0000 0000 for failed to write, "0101 0101 0101 0101 for successful write), High violation (Crowbar off for backscatter modulation bit period), and TAGTRAILER (1-bit, "1").

Tag Erasing may be accomplished 16 bits at a time. Erasing the ID is only allowed if the Tag has not been previously locked. Upon receipt of a valid EraseID Command, the Tag executes the appropriate internal timing sequences required to program memory.

For example, an EraseID Command may include spinup bits (4-bit "0000"), Manchester high violation (1-bit), command bits (8-bit, "11000111"), and CRC8 (8-bit, calculated over all fields from the first command bit to the end of the ID).

In response to an EraseID command, a Tag in the starting state of "Selected" tries to erase ePC and CRC if it is not locked and remains in the state of "Selected." A Tag in the starting state of "Selected" sends a positive reply if successful and a negative reply if unsuccessful. A Tag in the starting state of "Awaiting first query" does not reply and remains in the state of "Awaiting first query." A Tag in the starting state of "Ready," "Waiting for ACK "or" Acknowledged" does not reply and enters into the state of "Ready."

Tags executing the EraseID command reply in the currently set backscatter mode, and at the currently set backscatter rate. (Both are set by a QueryA or QueryB command). They send a one, followed by a crowbar off for one bit period, 16 bits of data, followed by another crowbar off period, and a trailing 1.

For example, a reply to an EraseID command may include TAGSPINUP (1-bit, "1"), High violation (Crowbar off for backscatter modulation bit period), Tag confirm (16-bit, "0000 0000 0000 0000 for failed to erase, "0101 0101 0101 0101 for successful erase), High violation (Crowbar off for backscatter modulation bit period), and TAGTRAILER (1-bit, "1").

A VerifyID command scrolls out the entire contents of memory, including protected fields. The Tag does not respond to VerifyID after it is locked. The Tag is SELECTED before VerifyID can be executed.

For example, a VerifyID command may include spinup bits (4-bit "0000"), Manchester high violation (1-bit), command bits (8-bit, "11001000") and CRC8 (8-bit, calculated over all the command bits).

In response to an EraseID command, a Tag in the starting state of "Selected" replies and remains in the state of "Selected", if it is not locked. A Tag in the starting state of "Selected" does not reply and enters into the state of "Ready," if it is not locked. A Tag in the starting state of "Awaiting first query" does not reply and remains in the state of "Awaiting first query." A Tag in the starting state of "Ready," "Waiting for ACK "or" Acknowledged" does not reply and enters into the state of "Ready."

Tags matching their 16-bit handshake to that sent by the Reader reply in the currently set backscatter mode, and at the currently set backscatter rate. (Both are set by a QueryA or QueryB command). They respond by sending four (4) one (1) bits followed by a high violation for one Reader to Tag bit time, and all the identification data in the Tag starting at bit 0. Data sent by the Reader to the Tag may be of variable length. The data is followed by a crowbar off (high) violation, and four trailing ones (1)s.

For example, a reply to a VerifyID command may include TAGSPINUP (4-bit, "1111"), High violation (Crowbar off for backscatter modulation bit period), Tag data (variable size, all Tag data contents, including protected fields), High violation (Crowbar off for backscatter modulation bit period) and TAGTRAILER (4-bit, "1111").

A LockID command is used to lock the identification (CRC and ePC) portions of a Tag's memory before it leaves a controlled supply channel. The Tag is SELECTED before LockID can be executed.

For example, a LockID command may include spinup bits (4-bit "0000"), Manchester high violation (1-bit), command bits (8-bit, "11001001") and CRC8 (8-bit, calculated over all the command bits).

In response to a LockID command, a Tag in the starting state of "Selected" tries to lock ePC and CRC, if it is not locked. A Tag in the starting state of "Selected" remains in the state of "Selected" and provides a positive response if successful and a negative response if unsuccessful. A Tag in the starting state of "Awaiting first query" does not reply and remains in the state of "Awaiting first query." A Tag in the starting state of "Ready," "Waiting for ACK "or" Acknowledged" does not reply and enters into the state of "Ready."

Tags selected by the select command execute the LockID command and then reply in the currently set backscatter mode, and at the currently set backscatter rate (both are set by a QueryA or QueryB command). They send a one, followed by a crowbar off for one bit period, 16 bits from the table below, followed by another crowbar off period, and a trailing 1.

For example, a reply to a LockID command includes TAGSPINUP (1-bit, "1"), High violation (Crowbar off for backscatter modulation bit period), Tag confirm (16-bit, "0000 0000 0000 0000 for fail to LockID, "0101 0101 0101 0101 for Command successful), High violation (Crowbar off for backscatter modulation bit period), and TAGTRAILER (1-bit, "1").

Class II and higher Tags use the same singulation method and identification method as the class I Tags. In addition, they may have additional read/write memory, security features, sensors, etc. Class II Tags may also have a battery to realize sensor logging, for example.

Class III and above Tags are defined to have battery-assisted communications. Class III and above Tags respond to class I commands in a low power passive mode, or at longer ranges they use a key transmission to go to the battery assist communications mode. The wakeup key for class three and above Tags is described below. This allows them to avoid using their battery assist except for long-range exchanges which are specifically directed at them, reducing the use of battery power.

Communications with class II and above Tags are standardized into a handle based I/O data link. Handles are issued by an "authorizing agency" for a specific purpose, and together with the SCROLLMFG information, can be used to deduce and exercise the capabilities of a Tag. A few example capability codes and corresponding handles include:

00XX XXXX XXXX XXXX for handles and capabilities by look up table;

01XX XXXX XXXX XXXX for handles and capabilities by subfields;

01XX XXXX XXXX 0000 for no memory,

01XX XXXX XXXX 0001 for bit wide memory, 0-7FFFFF memory address in bits,

Read LEN bits starting at given address, Write LEN bits at given address;

01XX XXXX XXXX 0010 for Byte wide memory, 0-7FFFFF Memory addresses in bytes, Read LEN Bits starting at given address, Write LEN bits at given address; 01XX XXXX XXX1 XXXX for Scratchpad type Memory, such as 1) 1-7FFFFF Memory addresses, Read LEN Bits starting at given address, Write address and LEN data bits to scratch pad, or 2) FFFFFF, Verify scratchpad data and address, or 3) FFFFFE, Write scratch pad to memory;

01XX XXXX 000X XXXX for no security;
01XX XXXX 001X XXXX for Key exchange security, such as 1) FFFFFD, Write security token, LEN bits long, or 2) FFFFFC, Read security token;
01XX XX00 XXXX XXXX for No temperatures;
01XX XX01 XXXX XXXX for Temperature interval recorder, such as 1) FFFFFFB Interval, Set interval in seconds, Read current interval, or 2) FFFFFFA, Set number of temperatures to read at a time, or 3) FFFE 0000 0000-FEFE FFFF FFFF, Read temps, Handle-FFFE0000000 0 intervals into past.

A READ command is the basic command for fetching data from the class II or higher Tag. It is addressed only by the SELECTED addressing mode, and uses a 24 bit PTR field which is a read address or handle, and a LEN field which is the number of bits to read, or is used as a second parameter whose meanings are to be determined by the handle.

For example, a READ command may include spinup bits (4-bit "0000"), Manchester high violation (1-bit), command bits (8-bit, "11010000"), Read handle (24-bit, Meaning defined by capability code); Data Area (2-bit, "00" for CRC & ePC, "01" for user data (none for class I), "10" for kill code), Length (8-bit, length of data to read), and CRC8 (8-bit, calculated over all fields from the first command bit to the end of length).

The data returned by the Tag is determined by the capacity code and the handle used. It may contain a CRC.

For example, a reply to a read command includes TAGSPINUP (1-bit, "1"), High violation (Crowbar off for backscatter modulation bit period), Data (variable size data), High violation (Crowbar off for backscatter modulation bit period) and TAGTRAILER (1-bit, "1").

A WRITE command is the basic command for writing data to the class II or higher Tag. It is addressed only by the SELECTED addressing mode, and uses a 24-bit PTR field which is a read address or handle, a 16-bit LEN, and a variable length data field whose length is determined by the [LEN] parameter.

For example, a WRITE command includes spinup bits (4-bit "0000"), Manchester high violation (1-bit), command bits (8-bit, "110100001"), Write handle (24-bit, meaning defined by capability codes), Length (8-bit, length of data (granularity defined by handle & capability codes)), Data to write (variable size) and CRC8 (8-bit).

Tags selected by the select command execute the WRITE command, and reply in the currently set backscatter mode, and at the currently set backscatter rate. (Both are set by a QueryA or QueryB command). They send a one, followed by a crowbar off for one bit period, 16 bits from the table below, followed by another crowbar off period, and a trailing 1.

For example, a reply to a WRITE command may include TAGSPINUP (1-bit, "1"), High violation (Crowbar off for backscatter modulation bit period), Tag confirm (16-bit, "0000 0000 0000 0000 for write failed, "0101 0101 0101 0101 for write successful), High violation (Crowbar off for backscatter modulation bit period), TAGTRAILER (1-bit, "1").

One embodiment of the present invention includes the use of the two-state symmetry of the protocol, which has advantages over an alternative ready-quiet protocol as is known in the art. The symmetric protocol effectively has less state dependence by symmetrizing quiet-ready states into two symmetrical halves, the State A and State B of the protocol.

The symmetry substantially increases the performance over ready-quiet protocols in cases where Tags have been inventoried and put into a quiet state, and it is desired to inventory them again, either from a different Reader station, or as part of a continuous inventory to monitor Tags being removed over time.

In the case of a ready-quiet protocol, the Tags, once placed in the quiet state, are touched by a talk command before they can participate in an inventory. Several talk commands can be issued before an inventory, but there is no guarantee that a Tag will receive the talk command if multi-path interference is high, the transmission frequency is wrong, or if the Tag is out of range of the Reader at that point in time. By eliminating the need to see a talk command, a Tag can be counted during a single "lucky" time or position, extending the effective reliable range of the protocol.

Using a timeout for a persistent quiet state is an alternative approach, but the manufacture of a Tag which has a tightly controlled persistence time is difficult. Also, for example, a 10 second timeout might be too short a time to inventory a large number of Tags, while a 30 second timeout might be long enough to interfere with multiple Readers tracking an item on a trajectory or catching a shoplifter in the act of destroying a Tag or putting the item into a shielded bag and walking away with an item.

One recommended implementation of the Tag is to supply a persistent node, which maintains its state for at least twenty seconds in the absence of power. Assuming that the persistent node decays to the zero (0) state, [0] encodes state A, and [1] encodes state B. State B expires with time into the state A. There is no upper bound on the time that state B persists, but it is not permitted to be in states where it is randomly powering up into state A or state B. The suggested implementation is to refresh the persistent node at some time during every command, weather or not the Tag is addressed by the command.

Readers would start by doing an inventory as described above, using QueryA or QueryRep commands, and ACKs. After no further Tags are responding, the Reader would continue to do high-level (e.g., addressing many tags using bit masking as described above) Query commands to explore any uncounted Tags. Note that a Tag in state A would be counted even if it were only powered for a brief time, just long enough to see a command to synchronize its clock, a QueryA, an ACK, and one subsequent command. At this point all Tags which had been inventoried would be in state B. After a predetermined amount of time, a new inventory would be done, in the same way, but using QueryB. There is no need to do any separate talk or wake commands, as all Tags that are powered at that moment would have been placed into state B already. After this inventory, all inventoried Tags are in the state A, and the Reader can continue to do high level QueryA commands for a while. Then an A inventory could start again, with no need to issue talk commands, so there is no possibility that a talk command is missed.

Any Tag that is continuously in the field is counted in every inventory, both the A and B flavors. Any Tag that enters the field is counted, in the worst case, in the second inventory after it enters the field, the same worst case time as if a ready-quiet protocol was used, even if a talk command at the beginning of each inventory was guaranteed to be received in the quiet-talk type protocol.

A persistent quiet capability in an RFID system provides consistency in counting Tags near the edge of a Reader's range when Tags are moving through the Reader's field. For Tags at the edge of the range, as the frequencies are changed and/or multi-path interference changes as the Tag or other objects are moved in the Reader field, the power available to the Tag fluctuates and may only be sufficient to power the Tag for brief periods of time. Persistent sleep allows the majority of Tags to be counted quickly, and then for Q=0 Queries to be repeated, seeking out Tags which are only intermittently powered. The symmetrical commands extend this comprehensive counting capability to Tags that have just been inventoried and put into the quiet state and would therefore potentially be missed if they did not receive a wakeup command. It is also useful as part of a continuous inventory process.

This approach prevents the Tags from ever entering a state where they are hard to count, as they would be in the quiet state of a ready-quiet protocol. It may seem that the quiet state is not hard to get out of, because a talk command can be used. However, if a Tag is unknown to the Reader, only a high level talk command potentially wakes it up, and a high level talk command would wake up all the other Tags as well. It may seem that if a Tag is in a quiet state, it has been recently inventoried anyway, but if a different Reader station did that inventory, or if a continuous inventory is desired, then the Tag needs to be inventoried again. If a Tag is in the quiet state in a ready-quiet protocol, it is touched twice, at two widely separated times and possibly two frequencies. It needs to be active once when the whole field of Tags is awakened and then again later when that particular Tag is to be inventoried. Needing two events to happen greatly impacts the probability of counting Tags which are on the margin of the RF range and are only intermittently powered, and that is avoided by using the symmetric protocol. Additionally, time is saved by not requiring additional talk commands to be issued.

In one embodiment of the present invention, the RF Transport Layer is designed for UHF operation, although other alternative operations can also be used. The Tag-to-Reader and Reader-to-Tag link is defined as half-duplex. Readers initiate communication with Tags by sending a command sequence. The Reader then provides a reply period for the Tag by transmitting an un-modulated carrier while listening for a reply from the Tag. The Tags are not expected to be able to detect Reader modulation while they are replying. The RF transport layer may use the following bands: 902-928 MHz and 2400.0-2483.5 MHz in North American, 869.4-869.65 MHz and 865.6-867.6 MHz in European, and UHF bands near 2450 MHz. These UHF bands have features including: high speed (up to 160 Kbps in North America) Reader-to-Tag system data rate; 320 kbps or faster Tag-to-Reader system data rate; consistent operation with high hit rates at ranges of 2 meters or more under typical conditions; relatively small Tag and Reader antennas; and North American bands are wide enough to permit significant frequency hopping.

Readers may be in one of three available states: OFF (emitting no RF energy), CW (emitting RF energy at some power level without amplitude modulation), and Active (emitting RF energy with amplitude modulation).

Figure 10:
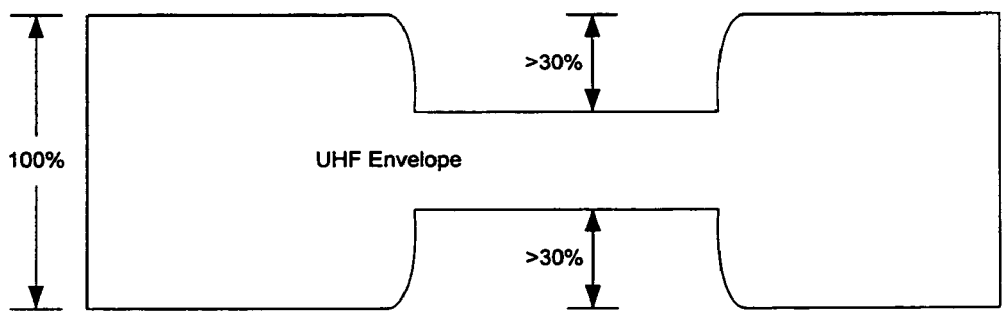
FIGS. 10-13 illustrate signal modulations for broadcasting from a Reader to Tags according to embodiments of the present invention.

FIG. 10 illustrates an embodiment of Reader-to-Tag Modulation. In the Active state, the Reader-to-Tag link makes use of split phase Manchester encoding with a minimum modulation depth of 30%. A data one (1) may be encoded by a high RF period followed by a low RF period. A data zero (0) may be encoded by a low RF period followed by a high RF period. Modulation shape, depth and rate of modulation are variable within the limits described below. Tags may adjust their timing over a range of modulation rates to lock to Reader transmissions automatically. The falling edges are held to a low amount of jitter from their nominal times as defined by the Manchester coding. The fall times can vary from their nominal value to accommodate a RF duty cycle.

Figure 11:
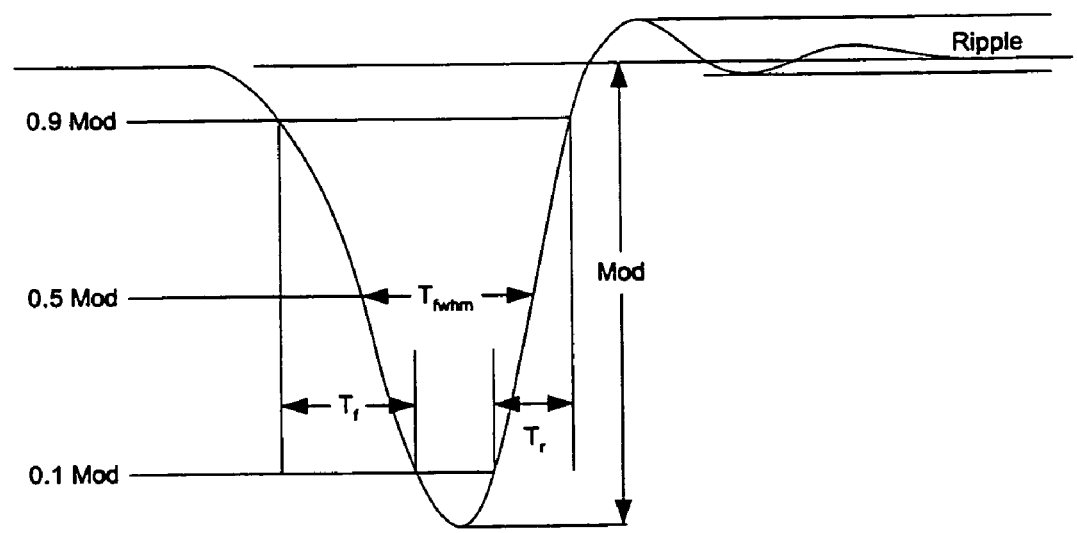

The modulation parameters in general are illustrated in FIG. 11. It will be understood that specific values of pulse modulation parameters can be a function of the local regulatory environment. For example, pulse modulation parameters may include:

$T_0$: Elemental Clock Cycle period. Time for a single bit sent from Reader to Tag.

$T_r$: Rise time of modulation envelope, 10% to 90% of Modulation amplitude variation.

$T_f$: Fall time of modulation envelope, 90% to 10% of Modulation amplitude variation $T_{fwhm}$: Pulse width of modulation envelope measured at 50% of Modulation amplitude variation.

Mod: Amplitude variation of modulated carrier.

Ripple: Peak to Peak variation in modulation overshoot and undershoot at edges of intended modulation.

$D_{mod}$: Peak-to-Peak variation in modulation depth from intended value.

$T_{0To/}$: Master Clock Interval Tolerance, Basic accuracy of Reader signaling.

TCW: Minimum CW time immediately before a command.

$T_{Coast}$: Maximum Time duration between EOF and the next command, to ensure that the Tag clock is sufficiently accurate to decode the next command.

In one implementation, for Reader modulation sequences, the Reader clock may be stable to within 1% over the length of a transaction. All other "Elemental Clock Cycle timings are proportional to the modulation clock frequency $T_0$. In one implementation, modulation parameters have the following values, in which all times and frequencies scale with $T_0$, except as noted.

$T_0$: Master Clock Interval (6 us to 24 us)

$T_{0To/}$: Master Clock Interval Tolerance (±0.1% Maximum)

DR: Data Rate ($1/T_0$)

$T_{risejitter}$: Maximum jitter from nominal in falling edges ($0.01*T_0$)

DutyCycle: RF high period duty cycle (=50% or >50%)

MOD: Modulation Depth (30% minimum)

$T_f$: Max fall Time (¼ $T_0$)

$T_r$: Max Rise Time (¼ $T_0$)

Ripple: Ripple (10% pp)

TCW: Minimum CW time preceding any command, may overlap with response CW interval ($4 \times T_0$)

$T_{Coast}$: Time duration between EOF and the next command (5 ms max., does not scale with $T_0$)

Figure 12:
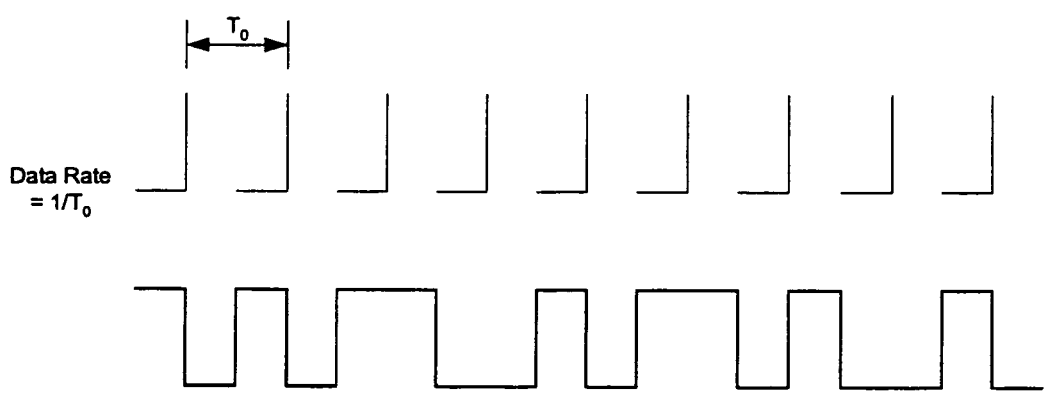

FIG. 12 illustrates an example of Reader to Tag modulation encoding. In one implementation, all transactions begin with a minimum CW period preceding each command to allow the Tag to locate the beginning of the command. All commands start with four spinup bits to synchronize the Tag clocks. During the Data Modulation of a command, Tags maintain their clock phase by reference to the falling edges of the Reader to Tag data modulation, which are held to low time jitter. The bit period time, $T_0$, determines the Reader-to-Tag data rate. After the last pulse, the Tag is ready to receive the next command after the minimum CW time, and be able to decode a command received within a $T_{coast}$ interval.

In order for the Tag to successfully decode the next command, the Reader starts the next transaction within the $T_{coast}$ interval. This restriction does not apply when the carrier has been turned off for sufficient time for the Tag to loose DC power, as the Tag re-synchronizes at the next power up. If the Tag clock frequency is adjusted by more than 20% in a spin up, the Tag does not respond to that command.

Figure 13:
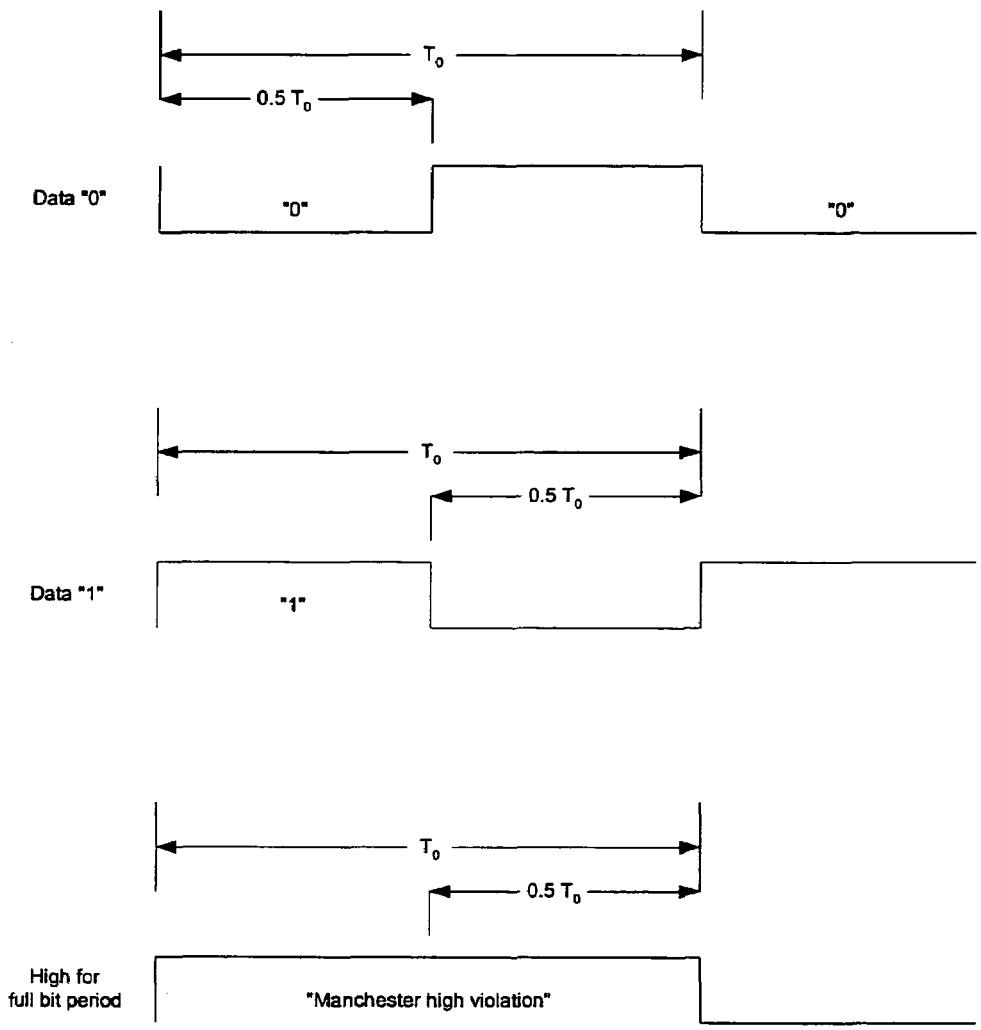

FIG. 13 illustrates data modulation timing for data "0," "1" and a Manchester high violation. Data Modulation Timing, $T_{data0}$, for Reader-to-Tag clocking when data="0," is encoded by an RF low period followed by a high period. Data Modulation Timing, $T_{data1}$, for Reader-to-Tag clocking when data="1", is encoded by an RF high period followed by an RF low period. Data Modulation Timing, $T_{data1}$, for Reader-to-Tag clocking for the Manchester high violation, is encoded by two consecutive RF high periods.

The Reader may optionally shorten the time between commands below that required for a response. The Reader may listen for a Tag reply during the reply period, and if a reply has NOT been started by a Tag prior to expiration of a time ($T_{TagscrollDel+2}*T_0$), may shorten the duration for that reply interval.

Tags reply to Readers by means of modulating their backscatter between two states. These two states may modulate the backscatter in phase or amplitude, or both.

One of these states is assumed, but not required, to impair the energy gathering ability of the Tag, and is referred to in this description as the "crowbar on" state. It is assumed that the backscatter state of the Tag is "crowbar off" until the start of backscatter modulation. As many Tags need to return to the "crowbar off" state at the end of backscatter modulation, all Tags are required to return their backscatter state to the state that they were in prior to starting a backscatter reply. This transition occurs after the end of the last backscatter transition transmitted (to the crowbar on state), at a time equal to that of the smallest feature size in the backscatter modulation mode.

The Tag-to-Reader modulation is selected by a [MODULATION] field of a Reader to Tag command, and is either FM0 in the case of [MODULATION]=0, or F2F, in the case of [MODULATION]=1, or an as yet undefined high frequency mode for [MODULATION]=3. All Tags may be required to implement all three forms of encoding. Readers may implement one or more decoders. The primitive for F2F encoding is the same, with the same timing, as FM0, but two FM0 primitives are used to encode each bit of F2F. A F2F encoder can be implemented using a FM0 encoder preceded by a bit inverter and encoding twice for each bit in succession.

In FM0, Tags reply to Reader commands with backscatter modulation. There is a change of backscatter state between each bit period, and a 0 bit has an additional change of backscatter state at the center of the bit time. The nominal data rate for Tag to Reader is four times the Reader to Tag Rate, but may vary up to ±10% over an 80-bit response window due to oscillator drift in the Tag. It is anticipated that FM0 is used in cases where the backscatter noise environment can be controlled (i.e. shielding around fluorescent lamps, etc.).

In F2F, Tags reply to Reader commands with backscatter modulation that follows a four (4)-interval bit cell encoding scheme. Two (2) transitions are observed for a zero (0) and four (4) transitions are observed for a one (1) during a Bit Cell. The nominal data rate for Tag to Reader is twice the Reader to Tag Rate, but may vary up to ±10% over an 80-bit response window due to oscillator drift in the Tag.

Some examples of the Tag to Reader modulation parameters are listed below.

$T_0$: Reader to Tag Master Clock Interval;

$T_{Tagbitcell}$: Tag to Reader bit cell interval ($T_0/4$ for FM0, $T_0/2$ for F2F);

Tag Data Rate: Tag to Reader Nominal Data Rate ($4/T_0$ for FM0, $2/T_0$ for F2F);

$T_{TagscrollDel}$: Reply delay from end of command to start of Tag ScrollID Reply ($2\times T_0$);

$T_{TagDel}$: Reply delay from end of command to start of Tag ID Reply ($2\times T_0$);

$T_{TagreplyNom}$: Tag to Reader reply duration for 8+16+96 bit ScrollID reply ($T_{Tagbitcell} \times 120$ bits);

$\Delta T_{Tagbitcell}$: Tag to Reader bit cell interval variation at last bit of 120 bit ScrollID reply (±10% max);

$T_{Coast}$: Time duration between EOF and the next command (5 ms max.).

Figure 14:
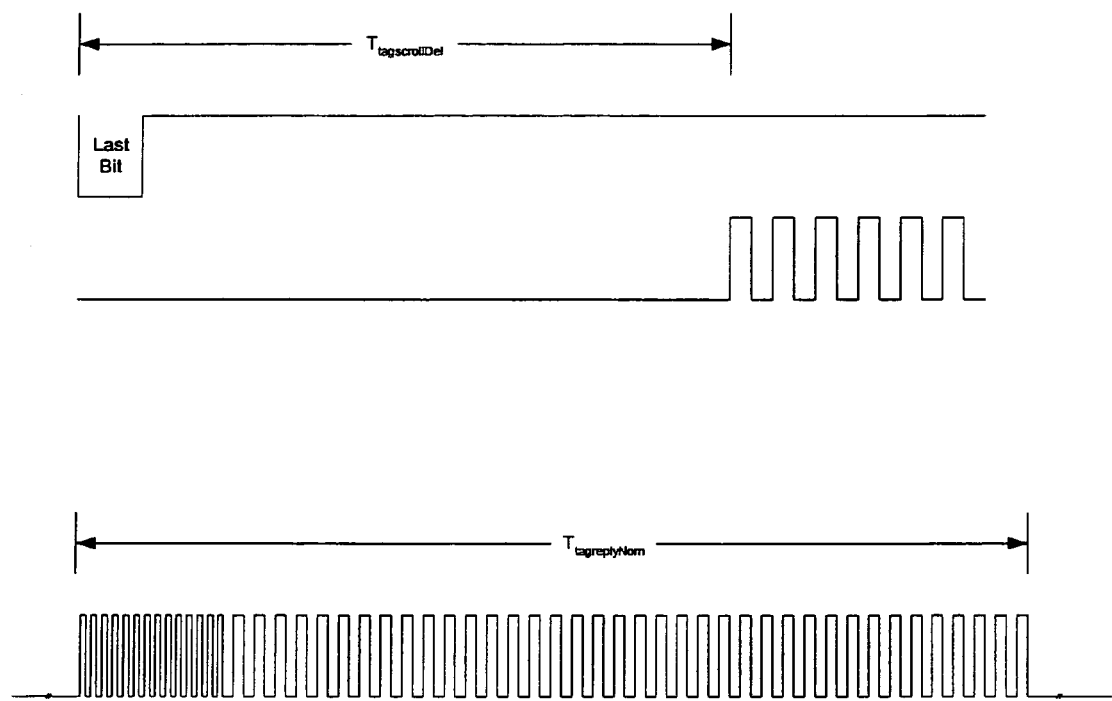
FIGS. 14-17 illustrate signal modulations for a Tag to reply to a Reader according to embodiments of the present invention.
Figure 15:
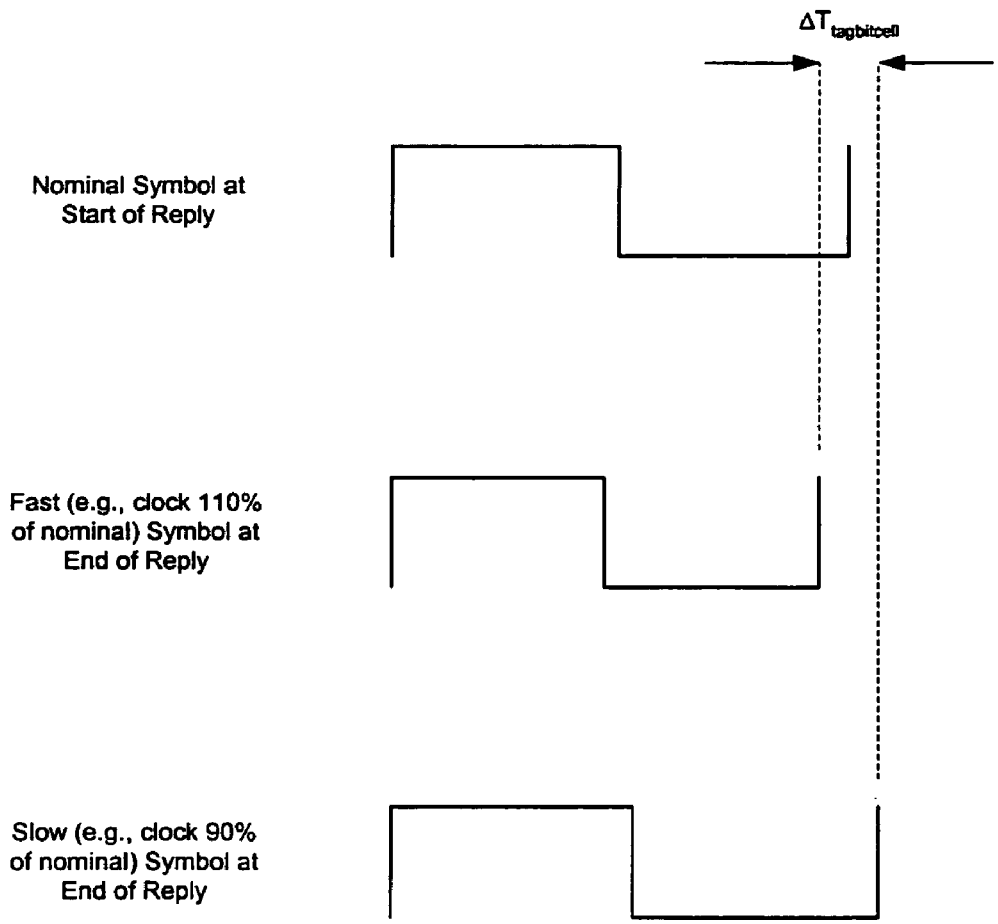

The delay from the end of data to the start of a reply to a ScrollID or VerifyID Command, $T_{TagscrollDel}$, is illustrated in FIG. 14. The duration of a ScrollID Reply, $T_{TagreplyNom}$, is also illustrated in FIG. 14. The variation in the bit cell duration, $\Delta T_{Tagbitcell}$, is illustrated in FIG. 15.

Figure 16:
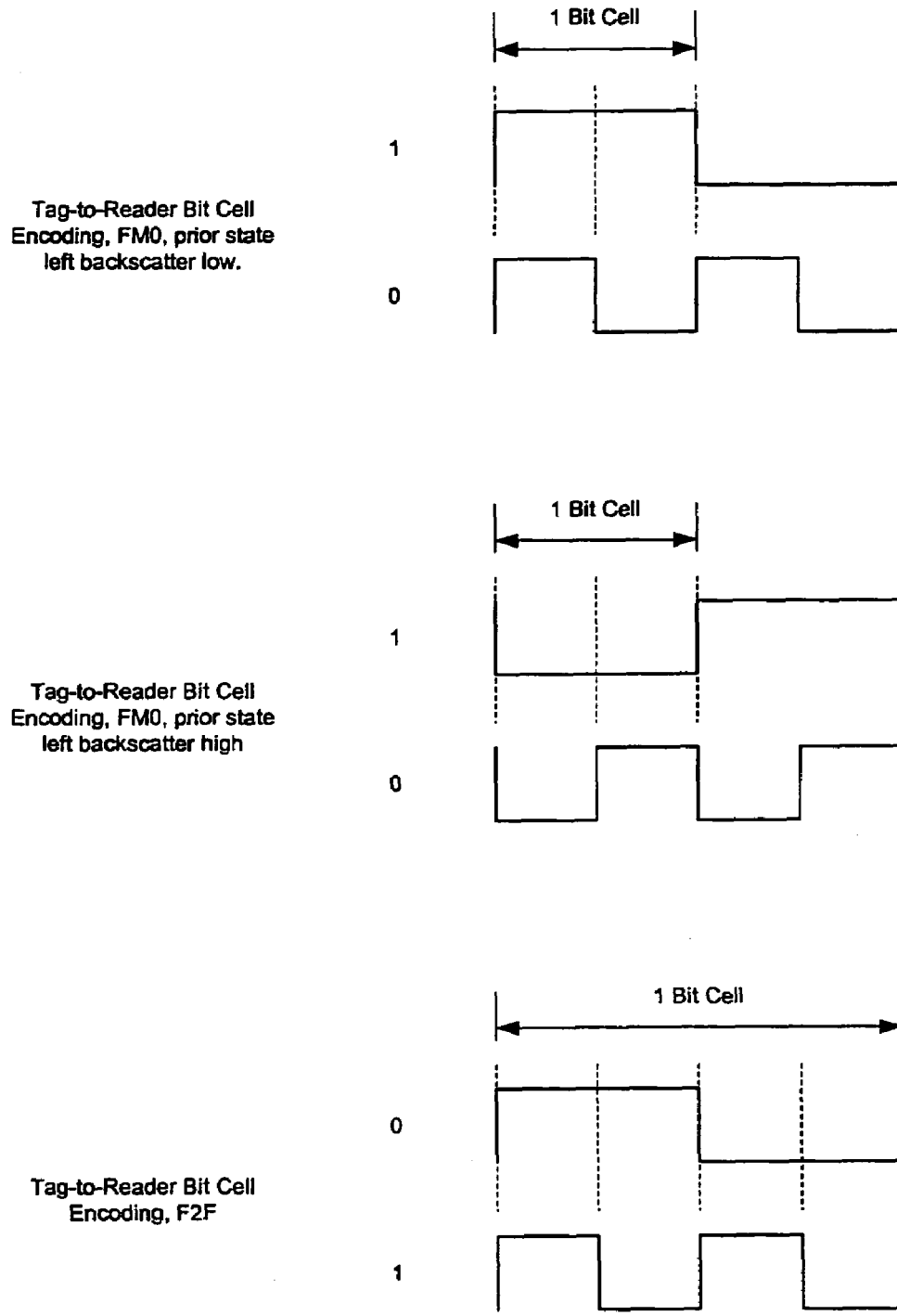

Tag-to-Reader bit cell encoding is illustrated in FIG. 16. In FM0 encoding, the state of the Tag backscatter is changed at the edge of each bit, and an additional change of state occurs in the middle of bit intervals which correspond to a "0" data bit. The crowbar starts in the off state, and makes its first transition to the on state at the beginning of the first data bit. A final bit interval transition is inserted at the end if it is needed to leave the modulation in the high state (not in the crowbar state), at the later edge of potentially one extra bit time.

Figure 17:
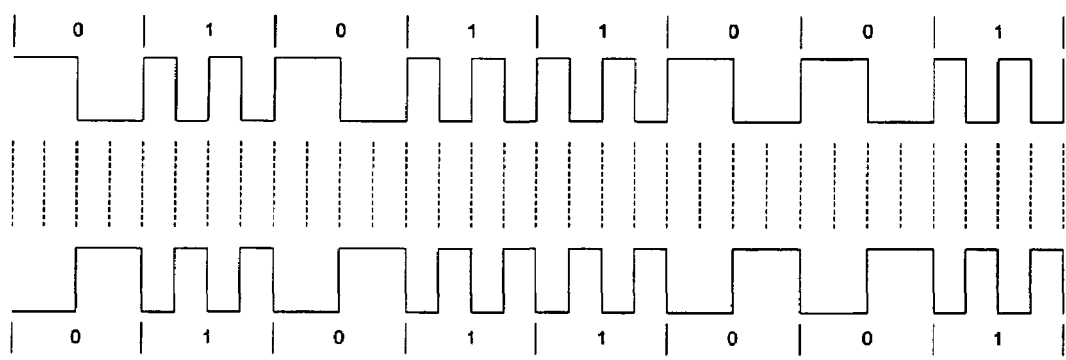

In F2F encoding, the Tag backscatter is modulated by a selection of one of two symbols per bit cell. Under this encoding scheme there are always transitions in the middle of a bit and unlike Manchester encoding, the sense of zeros and ones are maintained when the code is inverted. FIG. 17 illustrates this inversion.

It will be apparent from this description that aspects of the present invention may be embodied, at least in part, in software. That is, the techniques may be carried out in a computer system or other data processing system in response to its processor, such as microprocessor 113 or controller 207, executing sequences of instructions contained in a memory, such as memory 111 or memory 319. In various embodiments, hardwired circuitry may be used in combination with software instructions to implement the present invention. Thus, the techniques are not limited to any specific combination of hardware circuitry and software not to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 113 or the controller 207.

A machine-readable medium can be used to store software and data which when executed by a data processing system causes the system to perform various methods of the present invention. This executable software and data may be stored in various places including, for example, memory 111 or memory 319. Portions of this software and/or data may be stored in any one of these storage devices.

Thus, a machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM), random access memory (RAM), magnetic disk storage media, optical storage media and flash memory devices, etc.), as well as electrical, optical, acoustical or other forms of propagated signals (e.g., carrier waves, infrared signals, digital signals, etc.).

Some of the abbreviations used in this description are listed below.

AM: Amplitude Modulation;
CRC: Cyclic Redundancy Check;
CW: Continuous Wave;
kbps: kilobits per second;

LSB: Least Significant Bit;
ms: milliseconds (10-3 seconds);
MHz: megahertz (106 Hertz);
MSB: Most Significant Bit;
RAM: Random Access Memory;
RF: Radio Frequency;
RFID: Radio Frequency Identification;
RTF: Reader Talks First;
us: microseconds (10-6 seconds);
VLC: Very Low Cost; and In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to query a plurality of Tags, the method comprising:
   broadcasting through an antenna, one or more first query commands, a first query command of the one or more first query commands including a first value of a probability parameter, the first value of the probability parameter indicating a first level of probability of reply according to which each of the plurality of Tags randomly determines whether or not to reply with handshaking data which comprises a random number, wherein the first value of the probability parameter includes a first number Q, and the probability of reply for one of the plurality of tags includes a second number p based on the first number Q; and
   detecting a reply in response to the first query command, the reply including the handshaking data comprising the random number generated in response to the first query command, wherein the first query command further includes a state fin indicating a first state, wherein Tags in a second state do not reply to the first query command and Tags in the first state reply to the first query command randomly according to the first value of the probability parameter;
   broadcasting a second query command including a second value of the probability parameter and a state flag indicating the second state, wherein Tags in the first state do not reply to the second query command and Tags in the second state reply to the second query command randomly according to the second value of the probability parameter; and
   detecting a reply in response to the second query command, wherein the first and second query commands arc symmetric with respect to the first and second states.

2. The method of claim 1, further comprising:
   broadcasting, responsive to a determination that there is no reply to the one or more first query commands, a second query command including a second value of the probability parameter, the second value of the probability parameter indicating a second level of probability of reply which is greater than the first level of probability of reply.

3. The method of claim 1, further comprising:
   broadcasting, responsive to a determination that there is no legible reply to the one or more first query commands, a second query command including a second value of the probability parameters the second value of the probability parameter indicating a second level of probability of reply which is less than the first level of probability of reply.

4. The method of claim 1, wherein the first number Q is an integer, the first level of probability of reply for one of the plurality of Tags is equal to $p^Q$, and p is less than 1.

5. The method of claim 4, wherein p is equal to 0.5.

6. The method of claim 1, wherein the first level of probability of reply for a first one of the plurality of Tags is different from the first level of probability of reply for a second one of the plurality of Tags.

7. The method of claim 1, further comprising:
   sending, responsive to a legible reply to the first query command, wherein the legible reply includes the handshaking data, a second command including the handshaking data; and
   receiving Tag identification data as a reply to the second command.

8. The method of claim 7, further comprising:
   sending a command to indicate an error in receiving the Tag identification data when the Tag identification data is not received successfully.

9. The method of claim 1, further comprising:
   broadcasting a second query command without including a value of the probability parameter.

10. The method of claim 9, wherein
    the first query command includes first values of a plurality of parameters including the first value of the probability parameter; and
    the second query command does not include values of the plurality of parameters.

11. The method of claim 10, wherein the second query command is shorter than the first query command.

12. The method of claim 1, further comprising frequency hopping by a reader.

13. The method of claim 12, wherein the reader comprises an Ethernet network interface.

14. The method of claim 12, wherein the reader comprises first and second antennas.

15. The method of claim 1, wherein the Tag comprises a single antenna.

16. The method of claim 1, wherein the Tag is passive, backscatter transponder.

17. A method for a Tag to respond to queries from a Reader, the method comprising:
    receiving, through an antenna from the Reader a first query command including a first value of a probability parameter that indicates a first level of probability of reply;
    deciding randomly whether or not to reply to the first query command according to the first value of the probability parameter, wherein the first value of the probability parameter includes a first number Q, and the probability of reply includes a second number p based on the first number Q; and
    sending, responsive to a random decision to reply, a reply with handshaking data which comprises a random number generated in response to the first query command, wherein the first query command further includes a state flag indicating a first slate, and wherein the Tag does not reply to the first query command if the Tag is in a second state, and the Tag replies to the first query command randomly according to the first value of the probability parameter if the Tag is in the first state;
    receiving a second query command including a second value of the probability parameter and a state flag indicating the second state; and
    deciding randomly whether or not to reply to the second query command, wherein the level of probability of reply is determined by the second value of the probability parameter if the Tag is in the second state, and wherein the Tag does not reply to the second query command if the Tag is in the first state, wherein the Tag processes the first and second query commands with symmetry with respect to the first and second states.

18. The method of claim 17, wherein the Tag comprises a single integrated circuit which includes all necessary logic of the Tag, excluding an antenna.

19. The method of claim 18, wherein the random number is generated in response to the first query command and wherein the Tag comprises a persistent node.

20. The method of claim 17, wherein the first number Q is an integer, the first level of probability of reply is equal to $p^Q$, and p is less than 1.

21. The method of claim 20, wherein p is equal to 0.5.

22. The method of claim 17, further comprising:
sending, responsive to receiving from the Reader a second command including the handshaking data, a second reply with Tag identification data.

23. The method of claim 22, further comprising:
switching, responsive to receiving a query command after sending the second reply, from the first state to the second state, wherein after receiving a command indicating an error in receiving the Tag identification data at the Reader, the Tag remains in the first state if a query command is received after the command indicating the error.

24. The method of claim 17, further comprising:
receiving a second query command which does not include a value of the probability parameter; and
deciding randomly whether or not to reply to the second query command, wherein a level of probability of reply is determined by the first value of the probability parameter.

25. The method of claim 24, wherein
the first query command includes first values of a plurality of parameters including the first value of the probability parameter;
the second query command does not include values of the plurality of parameters; and
the Tag processes the second query command according to the first values of the plurality of parameters.

26. The method of claim 25, wherein the second query command is substantially shorter than the first query command.

27. The method of claim 17, wherein the Tag comprises a single antenna.

28. The method of claim 17, wherein the Tag is a passive, backscatter transponder.

29. The method of claim 17, wherein the antenna of the tag receives different frequencies the Reader performs frequency hopping.

30. A Reader to query a plurality of Tags, the Reader comprising:
means for broadcasting one or more first query commands, a first query command of the one or more first query commands including a first value of a probability parameter, the first value of the probability parameter indicating a first level of probability of reply according to which each of the plurality of Tags randomly determines whether or not to reply with handshaking data which comprises a random number, wherein the first value of the probability parameter includes a first number Q, and the probability of reply for one of the plurality of tags includes a second number p based on the first number Q; and
means for detecting a reply in response to the first query command, the reply including the handshaking data comprising the random number generated in response to the first query command, wherein the first tier command further includes a state flag indicating a first state, wherein Tags in a second state do not reply to the first query command and Tags in the first state reply to the first query command randomly according to the first value of the probability parameter;
means for broadcasting a second query command including a second value of the probability parameter and a state flag indicating the second state, wherein Tags in the first state do not reply to the second query command and Tags in the second state reply to the second query command randomly according to the second value of the probability parameter; and
means for detecting a reply in response to the second tier command, wherein the first and second query commands are symmetric with respect to the first and second states.

31. The Reader of claim 30, further comprising:
means for broadcasting, responsive to a determination that there is no reply to the one or more first query commands, a second query command including a second value of the probability parameter, the second value of the probability parameter indicating a second level of probability of reply which is greater than the first level of probability of reply.

32. The Reader of claim 30, further comprising:
means for broadcasting, responsive to a determination that there is no legible reply to the one or more first query commands, a second query command with a second value of the probability parameter, the second value of the probability parameter indicating a second level of probability of reply which is less than the first level of probability of reply.

33. The Reader of claim 30, wherein the first number Q is an integer, the first level of probability of reply for one of the plurality of Tags is equal to $p^Q$, and p is less than 1.

34. The Reader of claim 33, wherein p is equal to 0.5.

35. The Reader of claim 30, wherein the first level of probability of reply for a first one of the plurality of Tags is different from the first level of probability of reply for a second one of the plurality of Tags.

36. The Reader of claim 30, further comprising:
means for sending, responsive to a legible reply to the first query command, wherein the legible reply includes the handshaking data, a second command including the handshaking data; and
means for receiving Tag identification data as a reply to the second command.

37. The Reader of claim 36, further comprising:
means for sending a command to indicate an error in receiving the Tag identification data when the Tag identification data is not received successfully.

38. The Reader of claim 30, further comprising:
means for broadcasting a second query command without including a value of the probability parameter.

39. The Reader of claim 38, wherein
the first query command includes first values of a plurality of parameters including the first value of the probability parameter; and
the second query command does not include values of the plurality of parameters.

40. The Reader of claim 39, wherein the second query command is substantially shorter than the first query command.

41. The Reader of claim 30, wherein the Reader performs frequency hopping.

42. The Reader of claim 30, wherein the Reader comprises an Ethernet network interface.

43. The Reader of claim 30, wherein the Reader comprises first and second antennas.

44. A Tag responsive to queries from a Reader, the Tag comprising:
  means for receiving from the Reader a first query command including a first value of a probability parameter that indicates a level of probability of reply;
  means for deciding randomly whether or not to reply to the first query command according to the first value of the probability parameter, wherein the first value of the probability parameter includes a first number Q, and the probability of reply includes a second number p based on the first number Q; and
  means for sending, responsive to a random decision to reply, a reply with handshaking data which comprises a random number generated in response to the first query command, wherein the first query command further includes a state flag indicating a first state, and wherein the Tag does not reply to the first query command if the Tag is in a second state, and the Tag replies to the first query command randomly according to the first value of the probability parameter if the Tag is in the first state;
  means for receiving a second query command including a second value of the probability parameter and a state ha r indicating the second state; and
  means for deciding randomly whether or not to reply to the second query command, wherein a level of probability of reply is determined by the second value of the probability parameter if the Tag is in the second state, and wherein the Tag does not reply to the second query command if the Tag is in the first state, wherein the Tag processes the first and second query commands with symmetry with respect to the first and second states.

45. The Tag of claim 44, wherein the Tag comprises a single integrated circuit which includes all necessary logic of the Tag, excluding the antenna.

46. The Tag of claim 45, wherein the random number is generated in response to the first query command and wherein the Tag comprises a persistent node.

47. The Tag of claim 44, wherein the first number Q is an integer, the first level of probability of reply for one of the plurality of Tags is equal to $p^Q$, and p is less than 1.

48. The Tag of claim 47, wherein p is equal to 0.5.

49. The Tag of claim 44, further comprising:
  means for sending, responsive to receiving from the Reader a second command including the handshake data, a second reply with Tag identification data.

50. The Tag of claim 49, further comprising:
  means for switching, responsive to receiving a query command after sending the second reply, from the first state to the second state, wherein after receiving a command indicating an error in receiving the Tag identification data at the Reader, the Tag remains in the first state if a query command is received after the command indicating the error.

51. The Tag of claim 44, further comprising:
  means for receiving a second query command which does not include a value of the probability parameter; and
  means for deciding randomly whether or not to reply to the second query command, wherein a level of probability of reply is determined by the first value of the probability parameter.

52. The Tag of claim 51, wherein
  the first query command includes first values of a plurality of parameters including the first value of the probability parameter;
  the second query command does not include values of the plurality of parameters; and
  the Tag processes the second query command according to the first values of the plurality of parameters.

53. The Tag of claim 52, wherein the second query command is substantially shorter than the first query command.

54. A machine readable storage medium storing instructions which when executed on a data processing system causes the system to perform a method to query a plurality of Tags, the method comprising:
  broadcasting one or more first query commands, a first query command of the one or more first query commands including a first value of a probability parameter, the first value of the probability parameter indicating a first level of probability of reply according to which each of the plurality of Tags randomly determines whether or not to reply with handshaking data which comprises a random number, wherein the first value of the probability parameter includes a first number Q, and the probability of reply for one of the plurality of tags includes a second number p based on the first number Q; and
  detecting a reply in response to the first query command, the reply including the handshaking data comprising the random number generated in response to the first query command, wherein the first query command further includes a slate flag indicating a first state, wherein Tags in a second state do not reply to the first query command and Tags in the first state reply to the first query command randomly according to the first value of the probability parameter, wherein the method further comprises:
  broadcasting a second query command including a second value of the probability parameter and a state flag indicating the second state, wherein Tags in the first state do not reply to the second query command and Tags in the second state reply to the second query command randomly according to the second value of the probability parameter; and
  detecting a reply in response to the second query command, wherein the first and second query commands arc symmetric with respect to the first and second states.

55. The medium of claim 54, wherein the method further comprises:
  broadcasting, responsive to a determination that there is no reply to the one or more first query commands, a second query command including a second value of the probability parameter, the second value of the probability parameter indicating a second level of probability of reply which is greater than the first level of probability of reply.

56. The medium of claim 54, wherein the method further comprises:
  broadcasting, responsive to a determination that there is no legible reply to the one or more first query commands, a second query command with a second value of the probability parameter, the second value of the probability parameter indicating a second level of probability of reply which is less than the first level of probability of reply.

57. The medium of claim 54, wherein the first number Q is an integer, the first level of probability of reply for one of the plurality of Tags is equal to $p^Q$, and p is less than 1.

58. The medium of claim 57, wherein p is equal to 0.5.

59. The medium of claim 54, wherein the first level of probability of reply for a first one of the plurality of Tags is different from the first level of probability of reply for a second one of the plurality of Tags.

60. The medium of claim 54, wherein the method further comprises:
    sending, responsive to a legible reply to the first query command, wherein the legible reply includes the handshaking data, a second command including the handshaking data; and
    receiving Tag identification data as a reply to the second command.

61. The medium of claim 60, wherein the method further comprises:
    sending a command to indicate an error in receiving the Tag identification data when the identification Tag identification data is not received successfully.

62. The medium of claim 54, wherein the method further comprises:
    broadcasting a second query command without including a value of the probability parameter.

63. The medium of claim 62, wherein
    the first query command includes first values of a plurality of parameters including the first value of the probability parameter; and
    the second query command does not include values of the plurality of parameters.

64. The medium of claim 63, wherein the second query command is substantially shorter than the first query command.

65. The method of claim 54, wherein the system includes a reader performing frequency hopping.

66. The method of claim 54, wherein the system includes a reader that comprises an Ethernet network interface.

* * * * *